(12) United States Patent
Sugimura

(10) Patent No.: US 8,860,968 B2
(45) Date of Patent: Oct. 14, 2014

(54) ORIGINAL READING APPARATUS

(75) Inventor: Kenji Sugimura, Osaka (JP)

(73) Assignee: Sharp Kabushiki Kaisha, Osaka-Shi, Osaka (JP)

(*) Notice: Subject to any disclaimer, the term of this patent is extended or adjusted under 35 U.S.C. 154(b) by 0 days.

(21) Appl. No.: 13/595,569

(22) Filed: Aug. 27, 2012

(65) Prior Publication Data

US 2013/0063747 A1 Mar. 14, 2013

(30) Foreign Application Priority Data

Sep. 13, 2011 (JP) .............................. JP2011-199638

(51) Int. Cl.
*G06F 3/12* (2006.01)
*H04N 1/00* (2006.01)

(52) U.S. Cl.
CPC ....... *H04N 1/00424* (2013.01); *H04N 1/00724* (2013.01); *H04N 1/00753* (2013.01); *H04N 1/00474* (2013.01); *H04N 2201/0094* (2013.01); *H04N 1/00506* (2013.01); *H04N 1/0071* (2013.01); *H04N 1/00771* (2013.01); *H04N 1/00713* (2013.01); *H04N 1/00482* (2013.01); *H04N 1/00477* (2013.01); *H04N 1/00734* (2013.01); *H04N 1/00806* (2013.01)
USPC ......................................... 358/1.13; 358/1.15

(58) Field of Classification Search
CPC ......... G06F 15/00; G06F 15/02; G03G 15/00; G03B 27/52
See application file for complete search history.

(56) References Cited

U.S. PATENT DOCUMENTS

| | | | |
|---|---|---|---|
| 6,356,719 B1 * | 3/2002 | Yoshiura | ......................... 399/45 |
| 2001/0028808 A1 * | 10/2001 | Nomura et al. | .................. 399/81 |
| 2009/0180158 A1 * | 7/2009 | Suto | .............................. 358/474 |
| 2010/0107064 A1 | 4/2010 | Yamaguchi et al. | |

FOREIGN PATENT DOCUMENTS

JP 2005-017786 A 1/2005

* cited by examiner

*Primary Examiner* — Fred Guillermety
*Assistant Examiner* — Henok A Shiferaw
(74) *Attorney, Agent, or Firm* — Edwards Wildman Palmer LLP; David G. Conlin; George N. Chaclas

(57) ABSTRACT

An original reading apparatus provided with an original placement portion on which an original is place, and an original size/type detecting portion for detecting a size and/or a type of the original placed on the original placement portion, includes: a display portion that performs color display; and a display control portion that changes a color of a display screen displayed on the display portion based on the size and/or the type of the original detected by the original size/type detecting portion.

8 Claims, 18 Drawing Sheets

| Original size | Coloring |
|---|---|
| A3 | Black |
| B4 | Green |
| A4R | Pink |
| B5R | Gray |
| A4 | Orange |
| B5 | Blue |
| Non-standard | yellow |

TL3

FIG.12A [Initial: white] α
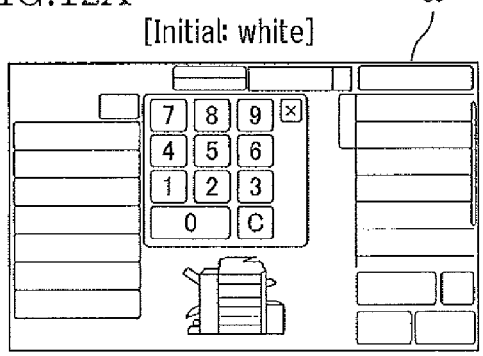
FIG.12E [A4R: pink] α
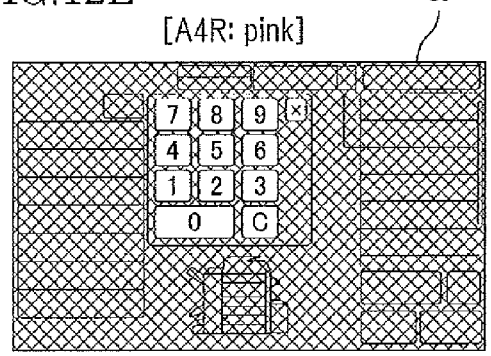
FIG.12B [B5: blue] α
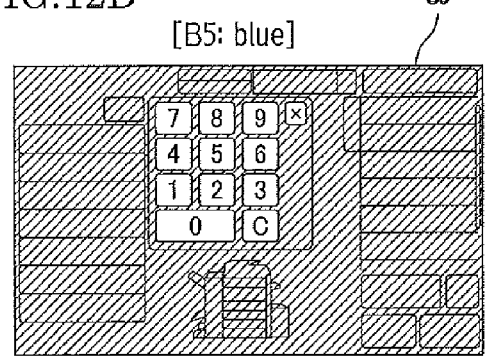
FIG.12F [B4: green] α
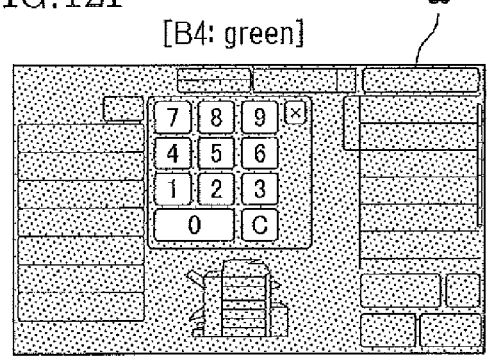
FIG.12C [A4: orange] α
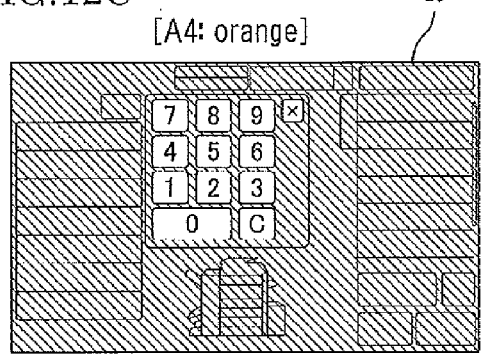
FIG.12G [A3: black] α
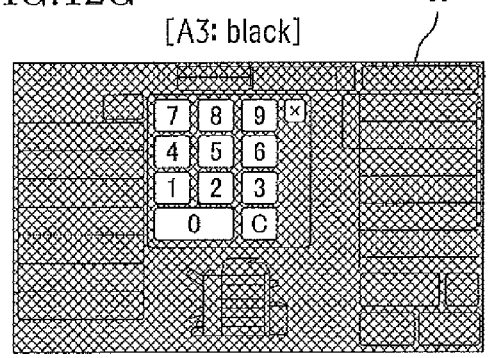
FIG.12D [B5R: gray] α
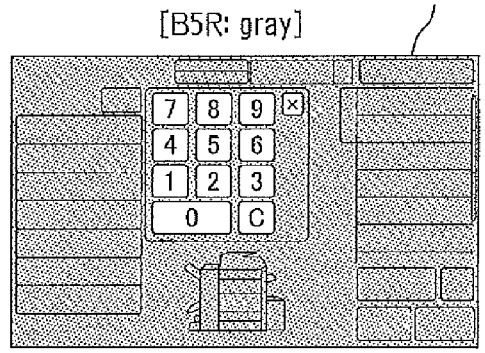
FIG.12H [Non-standard: yellow] α
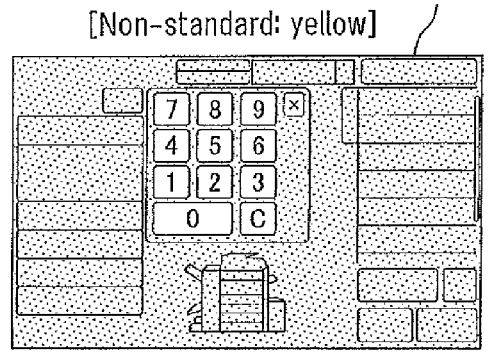

FIG.14

| Original size series | Coloring |
|---|---|
| A series | Orange |
| B series | Blue |
| Non-standard | Yellow |

TL3A

[Initial: white]

[B series: blue]

[A series: orange]

[Non-standard: yellow]

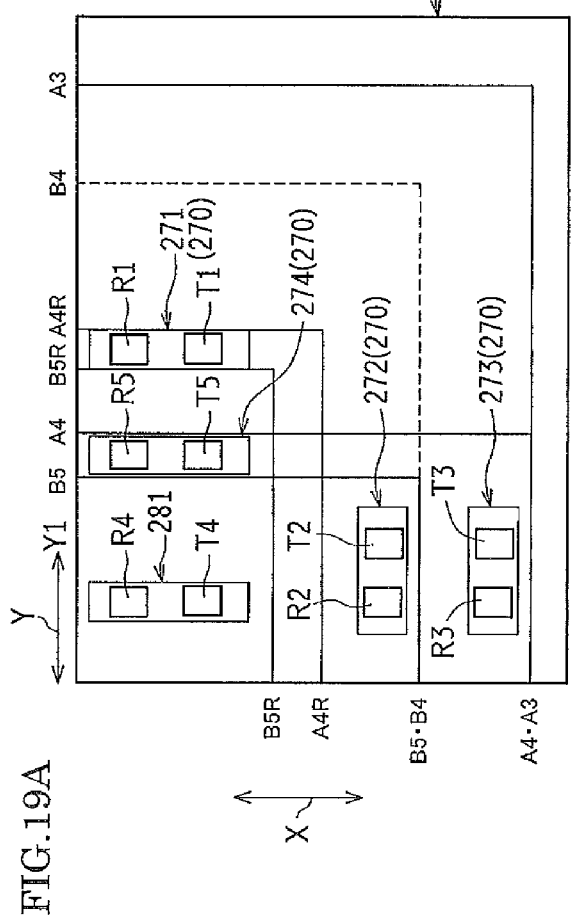

ORIGINAL READING APPARATUS

CROSS-REFERENCE TO RELATED APPLICATION

This application claims priority under 35 U.S.C. §119(a) on Patent Application No. 2011-199638 filed in Japan on Sep. 13, 2011, the entire contents of which are herein incorporated by reference.

BACKGROUND OF THE INVENTION

1. Field of the Invention

The present invention relates to an original reading apparatus provided in image forming apparatuses such as copy machines, facsimile apparatuses, and multifunction printers.

2. Description of the Related Art

The original reading apparatuses provided in image forming apparatuses such as copy machines, facsimile apparatuses, and multifunction printer include one that automatically detects the size of an original placed on an original placement portion such as an original placement stage by using an original size detecting portion such as an original size detection sensor.

In the image forming apparatus provided with such an original reading apparatus, if an original of a size other than regular sizes is placed on the original placement portion, or if the original is placed in a state where the placement position of the original on the original placement portion is shifted from the appropriate position, in some cases, the original size detecting portion detects the original size as a size not expected by the user, and detects the original size as the size different from the size of the original placed on the original placement portion. In this case, the user often realizes, only after looking at the size of a recording sheet on which an image has been formed, whether or not the original size detecting portion has detected the original size as the size different from the size of the original placed on the original placement portion. Then, if the user wants to form the image on a recording sheet of the proper size, it is necessary to form the image once again, resulting in waste.

In regard of this point, JP2010-109419A discloses an image forming apparatus including: a detecting portion that detects a paper size of an original to be scanned; a paper size recording unit that records the paper size of the original in association with image data of the scanned original in the order of scanned originals; and a preview image display control portion that refers to the recorded detection result, displays, on a display portion, a preview of the image data of the top page in each image data group indicating the same paper size, and also displays the paper size corresponding to the image data on the display portion.

However, in the image forming apparatus described in JP2010-109419A, even if the original size detecting portion that detects the size of the original placed on the original placement portion displays, on the display portion, the size of the original placed on the original placement portion, it is impossible to alert the user and reliably notify the user whether or not the original size detecting portion has detected a size different from the size of the original placed on the original placement portion.

SUMMARY OF THE INVENTION

Therefore, it is an object of the present invention to provide an original reading apparatus capable of alerting a user and reliably notifying the user whether or not an original size/type detecting portion that detects a size and/or a type of an original placed on an original placement portion has detected a size and/or a type different from the size and/or the type of the original placed on the original placement portion.

To achieve the foregoing object, the present invention provides an original reading apparatus provided with an original placement portion on which an original is place, and an original size/type detecting portion for detecting a size and/or a type of the original placed on the original placement portion, including: a display portion that performs color display; and a display control portion that changes a color of a display screen displayed on the display portion based on the size and/or the type of the original detected by the original size/type detecting portion. Further, according to the present invention, an image forming apparatus including the original reading apparatus according to the present invention can also be provided.

The "color" referred to in the present invention may include only chromatic colors, or may further include achromatic colors (white, black, and gray, which is a color therebetween). The "size of an original" referred to in the present invention indicates a combination of a size of an original in a depth direction (a front-to-back direction) of the original reading apparatus and a size of the original in a width direction (left-to-right direction) of the original reading apparatus.

According to the present invention, the display control portion changes the color of the display screen based on the size and/or the type of the original detected by the original size/type detecting portion, and it is thus possible to alert a user to whether or not the original size/type detecting portion has detected a size and/or a type different from the size and/or the type of the original placed on the original placement portion, and to thereby reliably notify the user thereof.

In the present invention, a mode in which the display control portion changes the color of the display screen to a unique color to each of the sizes and/or the types of the original detected by the original size/type detecting portion can be presented as an example.

With this feature, the display control portion changes the color of the display screen to a unique color to each of the sizes and/or the types of the original detected by the original size/type detecting portion, and it is thus possible to alert a user and reliably notify the user whether or not the original size/type detecting portion has detected a size anchor type different from the size and/or the type of the original placed on the original placement portion with respect to each size and/or the type of the original.

Incidentally, usually the original size/type detecting portion that detects at least the size of the original placed on the original placement portion often detects the adjoining size of the original in the order of the sizes of the original with its longitudinal direction aligned in one direction when the original is placed in a state where the placement position of the original on the original placement portion is slightly shifted from an appropriate position.

Therefore, in the present invention, a mode in which the original size/type detecting portion detects at least the sizes of the original placed on the original placement portion, and if the color of the display screen for one of two consecutive sizes in the order of the sizes of the original with its longitudinal direction aligned in one direction is an achromatic color, the color for the other size is a chromatic color can be presented as an example.

With this feature, the color of the display screen for one of two consecutive sizes in the order of the sizes of the original with its longitudinal direction aligned in one direction is an achromatic color, the color for the other size is a chromatic color, and it is thus possible to enable a user to easily recognize the difference between the achromatic color and the chromatic color as the colors for the two consecutive sizes in the order of the sizes of the original. Accordingly, it is therefore possible to clearly alert a user and reliably notify the user whether or not the original size/type detecting portion has detected a size different from the size of the original placed on the original placement portion.

In the present invention, a mode in which the original size/type detecting portion detects at least the sizes of the original placed on the original placement portion, and if both colors of the display screen for two consecutive sizes in the order of the sizes of the original with its longitudinal direction aligned in one direction are chromatic colors, those chromatic colors are colors opposite to each other can be presented as an example.

With this feature, if both colors of the display screen for two consecutive sizes in the order of the sizes of the original with its longitudinal direction aligned in one direction are chromatic colors, those chromatic colors are colors opposite to each other. It is thus possible to enable a user to easily recognize the difference between the chromatic colors as the colors for the two consecutive sizes of the original in the order of the sizes of the original. Accordingly, it is therefore possible to clearly alert a user and reliably notify the user whether or not the original size/type detecting portion has detected a size different from the size of the original placed on the original placement portion.

Further, the two consecutive sizes of the original in the order of the sizes of the original according to the plurality of size series (specifically, A series and B series) defined by ISO 216 is sizes of different size series (specifically, when one of two consecutive sizes is A4 size, which is one of A series, the other size is B4 size or B5 size, which is one of B series).

Therefore, in the present invention, a mode in which the original size/type detecting portion detects at least the size of the original placed on the original placement portion, and the display control portion changes the color of the display screen according to a size series defined by ISO 216 corresponding to the size of the original detected by the original size/type detecting portion can be presented as an example.

With this feature, with a simple control configuration in which the display control portion changes the color of the display screen according to the size series, it is possible to alert a user and reliably notify the user whether or not the original size/type detecting portion has detected a size different from the size of the original placed on the original placement portion.

In the present invention, a mode in which if the color of the display screen for one of two consecutive series of the original defined by ISO 216 is an achromatic color, the color for the other series is a chromatic color can be presented as an example.

With this feature, the color of the display screen for one of the two consecutive series (specifically, A series and B series) of the original defined by ISO 216 is an achromatic color, the color for the other series is a chromatic color, and it is thus possible to enable a user to easily recognize the difference between the achromatic color and the chromatic color as the colors for the two consecutive series of the original. Therefore, it is possible to clearly alert a user and reliably notify the user whether or not the original size/type detecting portion has detected a size different from the size of the original placed on the original placement portion.

In the present invention, a mode in which both colors of the display screen for two consecutive series of the original defined by ISO 216 are chromatic colors, those chromatic colors are colors opposite to each other can be presented as an example.

With this feature, if both colors of the display screen for the two consecutive series (specifically, A series and B series) of the original defined by ISO 216 are chromatic colors, those chromatic colors are colors opposite to each other, and it is thus possible to enable a user to easily notify the difference between the chromatic colors as the colors for the two consecutive series of the original. Therefore, it is possible to clearly alert a user and reliably notify the user whether or not the original size/type detecting portion has detected a size different from the size of the original placed on the original placement portion.

In the present invention, a mode in which the original size/type detecting portion detects at least the size of the original placed on the original placement portion, the color of the display screen includes a color corresponding to a size other than a regular size of the original, and if the size of the original detected by the original size/type detecting portion is the size other than the regular size, the display control portion sets the color of the display screen to the color corresponding to the size other than the regular size can be presented as an example.

With this feature, even if the size of the original detected by the original size/type detecting portion is a size other than the regular size, it is possible to alert a user and reliably notify the user whether or not the original size/type detecting portion has detected a size different from the size of the original placed on the original placement portion.

In the present invention, a mode in which the color of the display screen includes, as an initial color displayed on an initial screen, a color other than a color set for the size and/or the type of the original to be detected by the original size/type detecting portion, and upon the original size/type detecting portion detecting the size and/or the type of the original, the display control portion changes the initial color of the initial screen to a color corresponding to the size and/or the type of the original detected by the original size/type detecting portion can be presented as an example.

With this feature, it is possible to enable a user to easily recognize that the original size/type detecting portion has detected the size and/or the type of the original from the initial screen state.

In the present invention, a mode in which the display control portion is capable of changing a setting for the color of the display screen corresponding to the size and/or the type of the original can be presented as an example.

With this feature, it is possible to arbitrarily change the color of the display screen corresponding to the size and/or the type of the original by user's selection operation, and thus possible to set the color of the display screen to suit user's preference.

In the present invention, the original size/type detecting portion may have a configuration for detecting the size and/or the type of the original by performing scan reading on the original (a configuration for detecting the size and/or the type with so-called pre-scanning), but preferably is a sensor (e.g., a reflective optical sensor for detecting light reflected from the original) that detects a change in the size and/or the type of the original placed on the original placement portion immediately responding to the change in the size and/or the type of the original. In this case, a mode in which the display control portion immediately changes the color of the display screen upon the sensor detecting the change in the size and/or the type of the original can be presented as an example.

With this feature, the display control portion immediately changes the color of the display screen upon the sensor detecting the change in the size and/or the type of the original, and it is thus possible to immediately alert a user to whether or not the original size/type detecting portion has detected a size and/or a type different from the size and/or the type of the original placed on the original placement portion, and to thereby quickly and reliably notifying the user thereof.

In the present invention, the display control portion preferably changes the color of the display screen before reading processing for reading an image of the original placed on the original placement portion is started (accordingly, before printing processing performed as necessary after the reading processing is started). It is thus possible to alert a user, before the reading processing is started, to whether or not the original size/type detecting portion has detected a size and/or a type different from the size and/or the type of the original placed on the original placement portion. In this case, as the original size/type detecting portion, for example, the above-mentioned configuration for detecting the size and/or the type of the original with pre-scanning, the above-mentioned sensor that detects the size and/or the type of the original immediately responding to a change in the size and/or the type of the original, and the like may be used.

BRIEF DESCRIPTION OF THE DRAWINGS

FIG. 6A is a schematic plan view showing an arrangement of original size detection sensors, FIG. 6B is a schematic diagram showing a data structure of an original size detection flag setting table that indicates whether or not light has been received by light-receiving portions in the original size detection sensors, and FIG. 6C is a schematic diagram showing a data structure of an original detection flag setting table that indicates whether or not light has been received by the light-receiving portion in an original sensor.

FIGS. 12A to 12H are schematic plan views showing background colors of the basic screen displayed on the display portion as a result of the first display control, where FIGS. 12A to 12H are diagrams showing background colors for an initial screen, B5 size, A4 size, B5R size, A4R size, B4 size, A3 size, and the non-standard size, respectively.

FIG. 14 is a diagram for illustrating second display control for changing the color of the basic screen according to a size series defined by ISO 216 corresponding to the size of the original detected by the original size detecting portion, and is a schematic diagram showing a data structure of a color-by-original-size-series setting table.

FIGS. 16A to 16D are diagrams showing background colors for the initial screen, B series, A series, and the non-standard size, respectively.

FIG. 17A is a diagram showing a setting screen for changing the setting for the colors of the basic screen for the sizes of the original in the first display control, and FIG. 17B is a diagram showing a setting screen for changing the setting for the colors of the basic screen for the size series of the original in the second display control.

FIGS. 19A to 19C are diagrams for illustrating detection of the size of the original and whether or not there the original exists, where 19A is a schematic plan view of an arrangement of original size detection sensors, FIG. 19B is a schematic diagram showing a data structure of an original size detection flag setting table that indicates whether or not light-receiving portions in the original size detection sensors has received light, and FIG. 19C is a schematic diagram showing a data structure of an original detection flag setting table that indicates whether or not a light-receiving portion in an original sensor has received light.

DESCRIPTION OF THE PREFERRED EMBODIMENT

Embodiments of the present invention will be hereinafter described with reference to the drawings. Note that the embodiments described below are exemplary embodiments of the present invention, and does not restrict the technical scope of the present invention.

Overall Configuration of an Image Forming Apparatus

Figure 1:
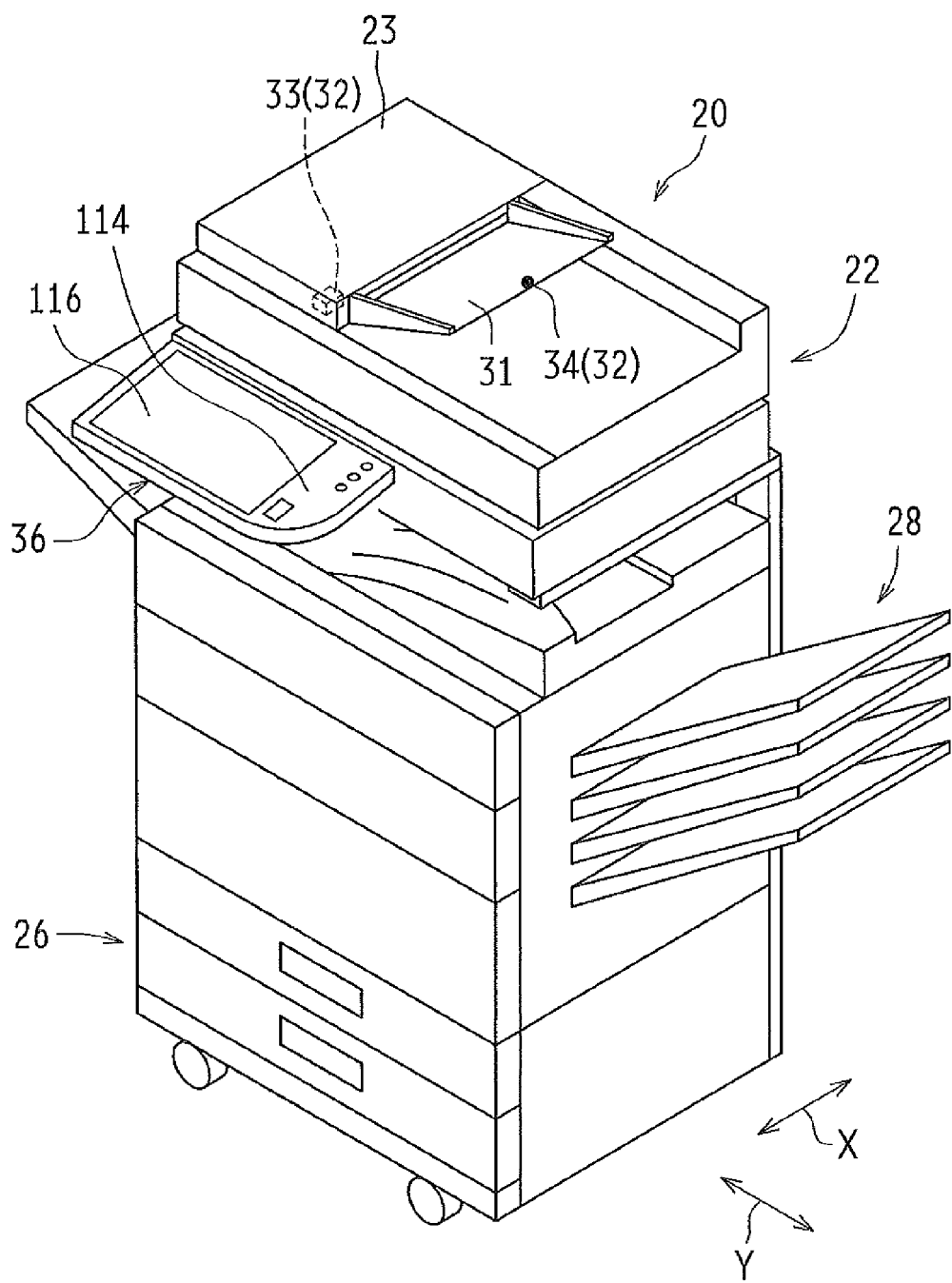
FIG. 1 is a perspective view showing a schematic configuration of an image forming apparatus including an original reading apparatus according to one embodiment of the present invention.
Figure 2:
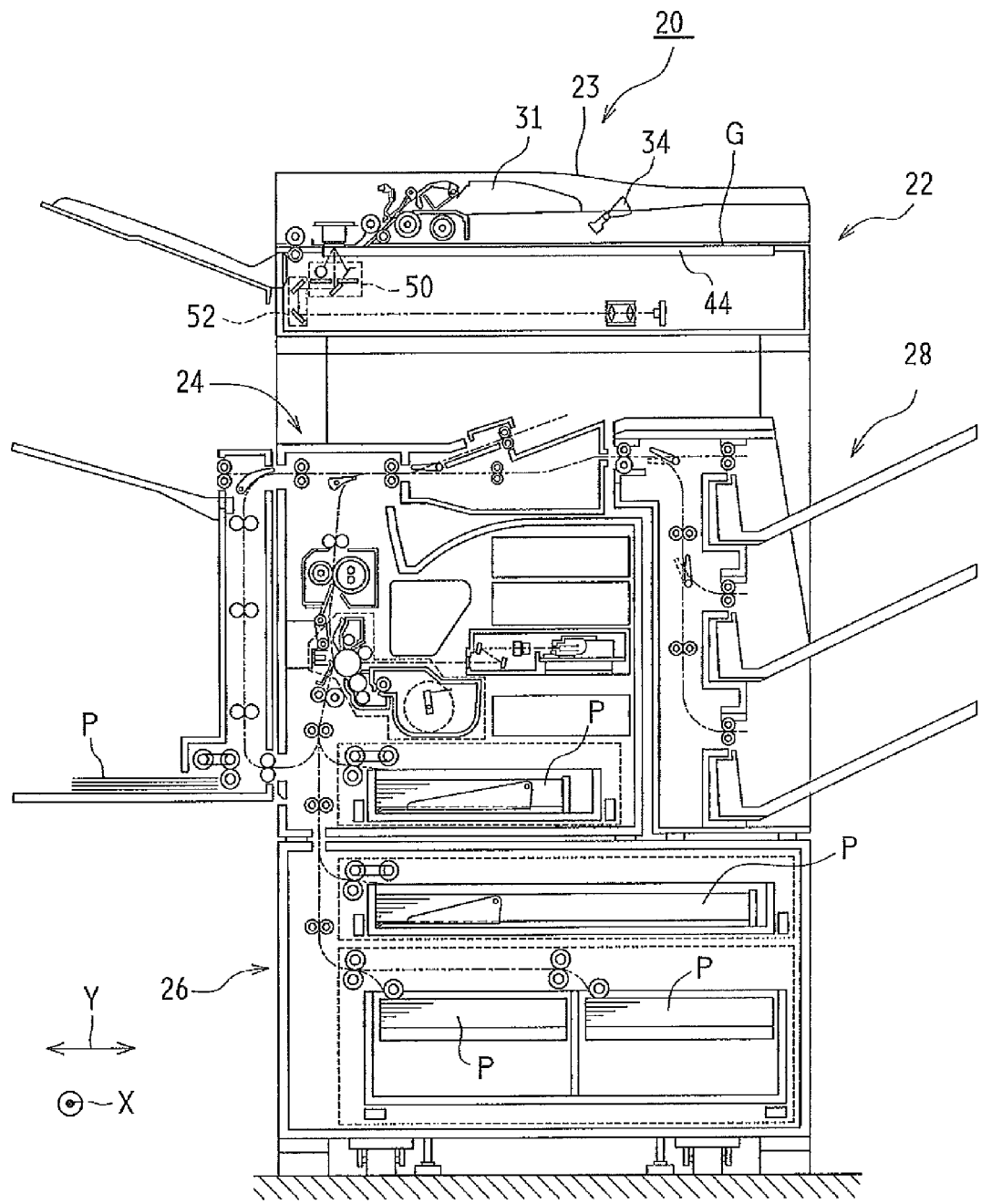
FIG. 2 is a cross-sectional view showing a schematic configuration of the image forming apparatus shown in FIG. 1.
Figure 3:
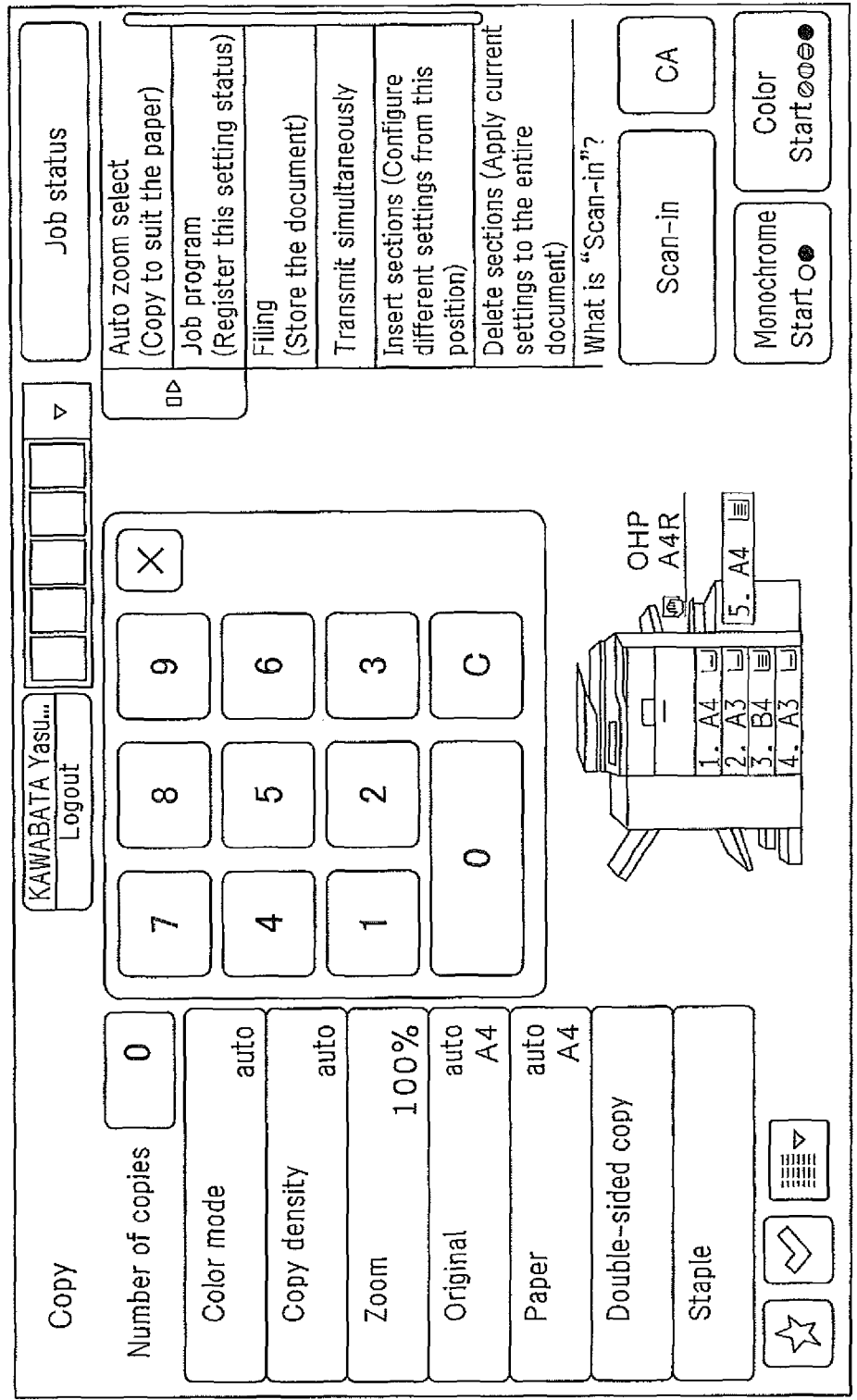
FIG. 3 is a schematic plan view showing a display portion in an operation unit in the image forming apparatus shown in FIGS. 1 and 2.
Figure 4:
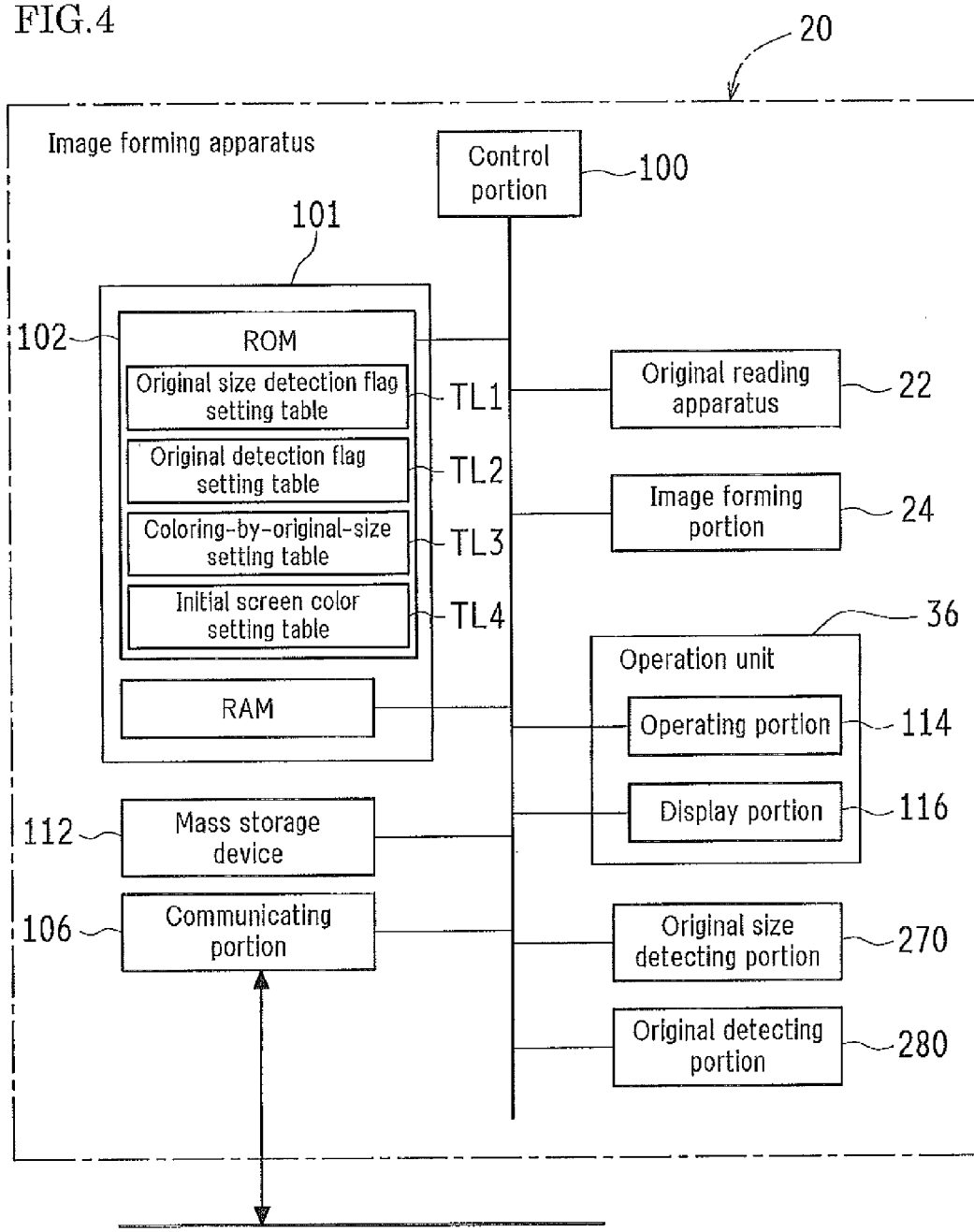
FIG. 4 is a schematic block diagram showing an example of a hardware configuration of the image forming apparatus shown in FIGS. 1 and 2.

FIG. 1 is a perspective view showing a schematic configuration of an image forming apparatus 20 that includes an original reading apparatus 22 according to one embodiment of the present invention. FIG. 2 is a cross-sectional view showing a schematic configuration of the image forming apparatus 20 shown in FIG. 1. FIG. 3 is a schematic plan view showing a display portion 116 in an operation unit 36 in the image forming apparatus 20 shown in FIGS. 1 and 2. Also, FIG. 4 is a schematic block diagram showing an example of a hardware configuration of the image forming apparatus 20 shown in FIGS. 1 and 2.

Here, the image forming apparatus 20 shown in FIGS. 1 and 2 is a digital multifunctional printer having a copy function with which an image of an original is read and this image is printed (image formation), a facsimile function with which facsimile communication is performed, and a printer function with which image data from an external apparatus (not shown in the figure) such as an information terminal apparatus is printed.

The image forming apparatus 20 is capable of selectively switching among a copy mode in which an image of an original is read and printed on a recording sheet (hereinafter referred to as recording paper) P such as a recording paper, a facsimile mode in which image data of an original is read and sent out, and also, image data of an original is received and printed on a recording paper P, and a printer mode in which an image received from an external apparatus via a communication means such as a network line is printed on a recording paper P.

The image forming apparatus 20 is provided with an original reading apparatus 22 configured to read an image of an original, an image forming portion 24 (see FIGS. 2 and 4) that performs print output for forming an image on a recording paper P based on image data corresponding to the image read by the original reading apparatus 22 with an electrophotographic process, an operation unit 36 (see FIGS. 1 and 4) that accepts setting information on various functions related to the image forming apparatus 20, a paper feed portion 26, and a discharge processing device 28. Also, as shown in FIG. 4, the image forming apparatus 20 is further provided with a control portion 100, an original size detecting portion 270 (an example of an original size/type detecting portion), an original detecting portion 280, a storage portion 101, a mass storage device 112 such as an HDD (Hard Disk Drive), and a communicating portion 106. Note that in FIG. 4, the paper feed portion 26 and the discharge processing device 28 shown in FIGS. 1 and 2 are omitted.

The display portion 116 displays a screen for operating the original reading apparatus 22. The display portion 116 is provided on the upper face of the operation unit 36. The display portion 116 has a color display device (e.g., a color LCD display device), and displays operation information such as an operation state of the image forming apparatus 20 and set values input from the operating portion 114. In the present embodiment, the display device in the display portion 116 is a display device with a built-in touch panel (a so-called touch panel display) equipped with an input device (specifically, a touch panel) configured to accept various selection operations given in response to user' input operation (e.g., touch operation) on a software key displayed on the screen.

The display operation of the display portion 116 is controlled by the control portion 100 (see FIG. 4). Specifically, upon any one of the various operation modes, namely the copy mode, the facsimile mode, and the printer mode being selected by user's selection operation on a home screen (not shown) displayed on the display portion 116, a basic screen α (the copy mode in the example shown in FIG. 3) is displayed on the display portion 116 as an operation screen on which display for performing operation of setting various functions, parameters, and the like of the selected mode is performed.

Regarding an Original Size Detecting Portion

Figure 5:
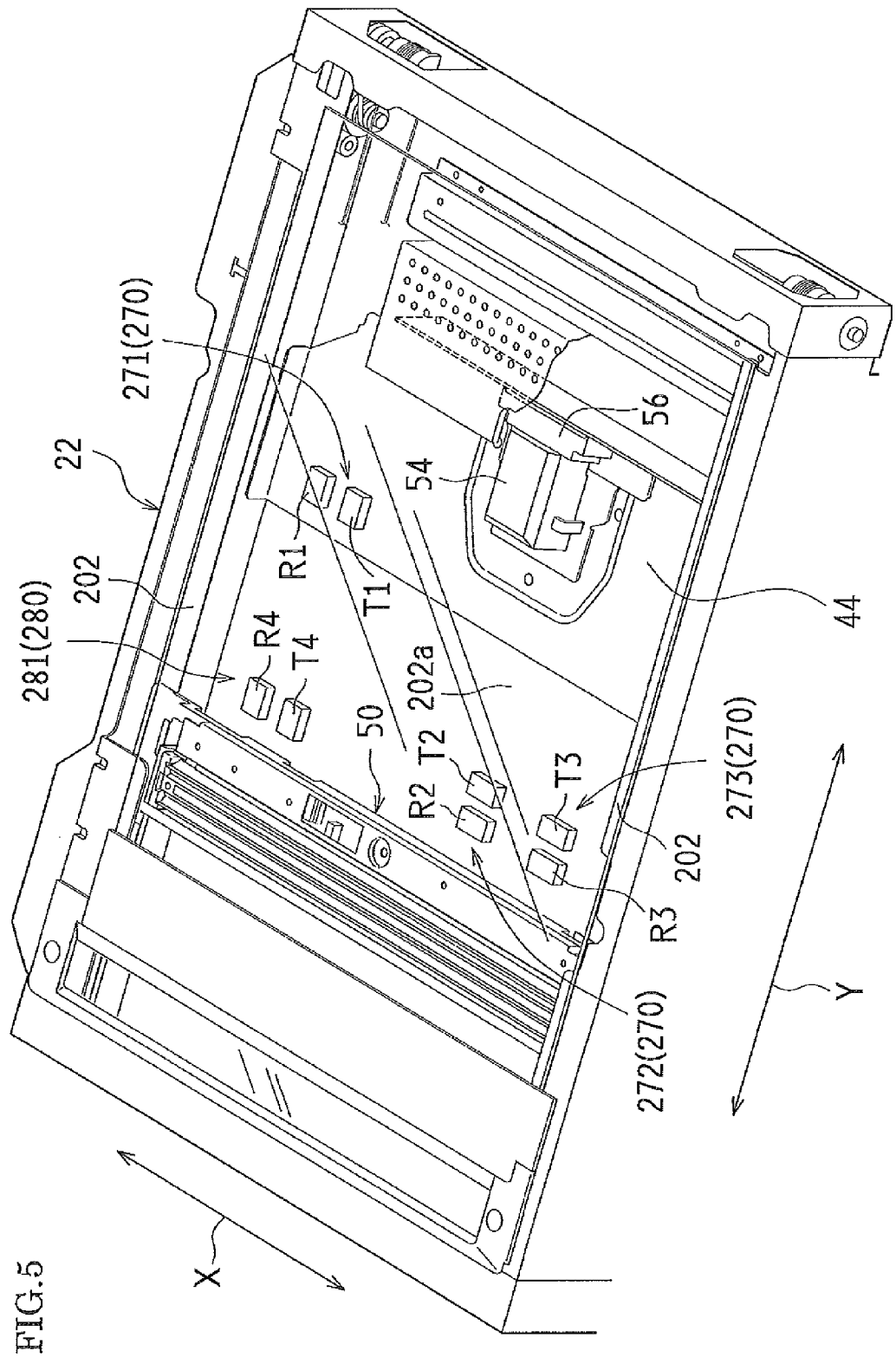
FIG. 5 is a schematic perspective view of the original reading apparatus shown in FIGS. 1 and 2 in a state where an original feeding device has been removed, viewed obliquely from the upper front.

FIG. 5 is a schematic perspective view of the original reading apparatus 22 shown in FIGS. 1 and 2 in a state where an original feeding device 23 has been removed, viewed obliquely from the upper front.

As shown in FIG. 5, the original size detecting portion 270 is constituted from a plurality of original size detection sensors 271, 272, and 273, and is provided on the bottom face (here, a face 202a of a frame body 202 facing a platen glass 44) of the original reading apparatus 22. The original size detecting portion 270 is connected to an input system of the control portion 100 (see FIG. 4).

In the present embodiment, the original size detection sensor 271 is an optical sensor for detecting the size of an original G in a sub-scanning direction Y, and the original size detection sensors 272 and 273 are optical sensors for detecting the size of the original G in a main scanning direction X. Specifically, the original size detection sensors 271, 272, and 273 are reflective optical sensors for detecting light reflected from the original G. More specifically, the original size detection sensors 271, 272, and 273 have illuminating portions T1, T2, and T3 for illuminating a prescribed kind of light (e.g., infrared light) and light-receiving portions R1, R2, and R3 for receiving light reflected from the original G, respectively.

Regarding the Original Detecting Portion

The original detecting portion 280 is constituted from an original sensor 281, and is provided at a position on the bottom face (here, the face 202a of the frame body 202 facing the platen glass 44) of the original reading apparatus 22 at which the originals G of all sizes placed on the platen glass 44 can be detected. The original detecting portion 280 is connected to the input system of the control portion 100 (see FIG. 4).

In the present embodiment, the original sensor 281 is an optical sensor for detecting whether or not the original G of any size exists. Specifically, the original sensor 281 is a reflective optical sensor for detecting light reflected from the original G. More specifically, the original sensor 281 has an illuminating portion T4 for illuminate a prescribed kind of light (e.g., infrared light), and a light-receiving portion R4 for receiving light reflected from the original G.

Regarding Detection of the Size of an Original and Whether or not an Original Exists by the Control Portion To the control portion 100, a sensor output signal (specifically, an on signal) indicating that the original G exists (light has been received) is sent from the light-receiving portions R1, R2, and R3 if light is illuminated from the illuminating portions T1, T2, and T3 in the original size detection sensors 271, 272, and 273 onto the platen glass 44 and the original G exists at a position on the platen glass 44 at which the light from the illuminating portions T1, T2, and T3 is illuminated (if the light-receiving portions R1, R2, and R3 has received the light reflected from the original G). Meanwhile, to the control portion 100, a sensor output signal (specifically, an off signal) indicating that there the original G does not exist (no light has been received) is sent from the light-receiving portions R1, R2, and R3 if there the original G does not exists on the platen glass 44 (if the light-receiving portions R1, R2, and R3 have not received light reflected from the original G). The control portion 100 detects (determines) the size of the original G by using the sensor output signal indicating the original G exists/does not exist (specifically, the on signal or the off signal) received from the light-receiving portions R1, R2, and R3.

Also, to the control portion 100, a sensor output signal (specifically, an on signal) indicating that there the original G exists (light has been received) is sent from the light-receiving portion R4 if light is illuminated from the illuminating portion T4 in the original sensor 281 onto the platen glass 44 and the original G exists on the platen glass 44 (if the light-receiving portion R4 has received light reflected from the original G). Meanwhile, to the control portion 100, a sensor output signal (specifically, an off signal) indicating that there the original G does not exist (light has not been received) is sent from the light-receiving portion R4 if there the original G does not exist on the platen glass 44 (if the light-receiving portion R4 has not received light reflected from the original). The control portion 100 detects (determines) whether or not the original G exists by using the sensor output signal (specifically, the on signal or the off signal) that indicates that the original G exists/does not exist received from the light-receiving portion R4.

Figure 6:
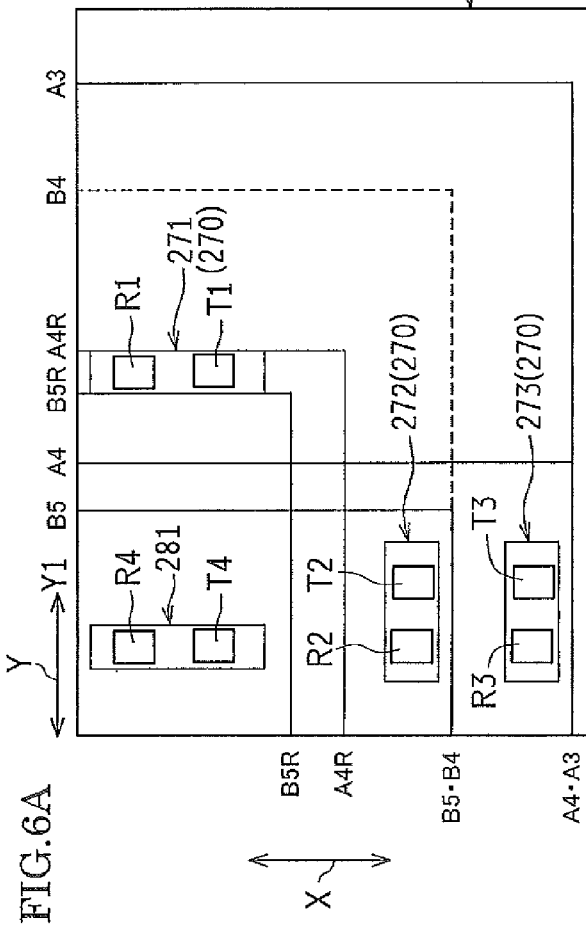
FIGS. 6A to 6C are diagrams for illustrating detection of the size of an original and whether or not an original exists, where

FIGS. 6A to 6C are diagrams for illustrating detection of the size of the original G and whether or not the original G exits. FIG. 6A is a schematic plan view showing an arrangement of the original size detection sensors 271, 272, and 273. FIG. 6B shows a data structure of an original size detection flag setting table TL1 that indicates whether or not light has been received by the light-receiving portions R1, R2, and R3 in the original size detection sensors 271, 272, and 273. FIG. 6C shows a data structure of an original detection flag setting table TL2 that indicates whether or not light has been received by the light-receiving portion R4 in the original sensor 281. Note that in FIG. 6A, signs B5 and A4 indicate the states of originals G of B5 size (176×250 mm) and A4 size (210×297 mm) arranged with their longitudinal direction being aligned with the main scanning direction X, respectively. In FIG. 6A, signs B5R, A4R, B4, and A3 indicate the states of the originals G of B5 size, A4 size, B4 size (250×353 mm), and A3 size (297×420 mm) arranged with their longitudinal direction being aligned with the sub-scanning direction Y, respectively.

Here, the image forming apparatus that uses centimeters will be described, but in an image forming apparatus that uses inches, the sizes such as letter size (8.5×11 inch), legal size (8.5×14 inch), Tabloid Ledger size (11×17 inch) defined by ANSI/ASME Y14.1 may be used as the regular sizes of the originals G.

In the example shown in FIG. 6A, the original G placed on the platen glass 44 is positioned with respect to both an edge on an upstream side (the left side in FIG. 6A) in a sub-scanning direction reading direction Y1 and an edge of one side (the upper side in FIG. 6A) in the main scanning direction X in an reading area.

As shown in FIG. 6B, the original size detection sensor 271 is provided at a position at which it outputs, from the light-receiving portion R1, a signal indicating that the original does not exist (no light has been received) if the original G is in an arrangement state of signs B5R, B5, or A4, and outputs, from the light-receiving portion R1, a signal indicating that the original exists (light has been received) if the original G is in any other arrangement state. The original size detection sensor 272 is provided at a position at which it outputs a signal indicating that the original does not exist if the original G is in an arrangement state of signs B5R or A4R, and outputs a signal indicating that the original exists if the original G is in any other arrangement state. The original size detection sensor 273 is provided at a position at which it outputs a signal indicating that the original does not exist if the original G is in an arrangement state of signs B5R, B5, B4, or A4R, and outputs a signal indicating that the original exists if the original G is in any other arrangement state.

If an original detection flag indicating whether or not light has been received by the light-receiving portion R4 is 1 (light has been received), the control portion 100 can determine the size of the original G by using the original size detection flag setting table TL1 shown in FIG. 6B. For example, if an original size detection flag (hereinafter simply referred to as "flag") R1 indicating whether or not light has been received by the light-receiving portion R1 is 0 (no light has been received), a flag R2 indicating whether or not light has been received by the light-receiving portion R2 is 0 (no light has been received), and a flag R3 indicating whether or not light has been received by the light-receiving portion R3 is 1 (light has been received), a detect error may have occurred or the original G is possibly an original in a variant shape, but the control portion 100 determines that the size of the original G is A4 because it has been determined that no light has been received by the light-receiving portion R1 and light has been received by the light-receiving portion R3. If the flag R1 is 1, the flag R2 is 0, and the flag R3 is 1, a detect error may have occurred or the original G is possibly an original in a variant shape, but the control portion 100 determines that the size of the original G is A3 because it has been determined that light has been received by the light-receiving portions R1 and R3. The original size detection flag setting table TL1 is stored in advance in a ROM 102 in the storage portion 101 (see FIG. 4).

As shown in FIG. 6C, the original sensor 281 is provided at a position at which it outputs a signal indicating that the original G exists if the original G is placed in a positioning state at an appropriate position on the platen glass 44, regardless of the arrangement state of the original G.

The control portion 100 can determine whether or not the original G exists by using the original detection flag setting table TL2 shown in FIG. 6C, In other words, the control portion 100 determines that there the original G exits if an original detection flag indicating whether or not light has been received by the light-receiving portion R4 is 1, and determines that the original G does not exist if the original detection flag indicating whether or not light has been received by the light-receiving portion R4 is 0. The original detection flag setting table TL2 is stored in advance in the ROM 102 in the storage portion 101 (see FIG. 4).

Note that the original size detecting portion 270 can works as an original detecting portion for the sizes other than B5R size even if the original detecting portion 280 is not provided. Also, the original size detecting portion 270 may serve concurrently as an original detecting portion by contriving the detection pattern of the original size detection sensor such that whether or not the original G of every size exists can be detected. This can be implemented with conventionally known methods, and a detailed description thereof is omitted here.

Further, although in the configuration of FIGS. 6A to 6C the size of the original G is not determined as the non-standard size, one more original size detection sensor may be added to the configuration of FIGS. 6A to 6C to have a configuration for detecting that the size of the original G is the non-standard size. Specifically, for example, as shown in FIG. 19A, a configuration in which the original size detection sensors 274 are added between B5 and A4 in the configuration of FIGS. 6A to 6C and it is detected that the size of the original G is the non-standard size may alternatively be adopted. The original size detection sensor 274 has an illuminating portion T5 for illuminating prescribed light (e.g., infrared light) and a light-receiving portion R5 for receiving light reflected from the original G.

With this configuration, if the original detection flag indicating whether or not light has been received by the light-receiving portion R4 is 1, the control portion 100 can determine the size of the original G by using an original size detection flag setting table TL1 shown in FIG. 19B. Also, with this configuration, the control portion 100 can determine whether or not the original G exists by using an original detection flag setting table TL2 shown in FIG. 19C.

Incidentally, if the original G of a size other than the regular sizes such as A3, B4, A4, and B5 (specifically, the non-standard size) is placed on the platen glass 44, or if the original G is placed in a state where the placement position of the original on the platen glass 44 is shifted from the appropriate position (the position where edges of the original G and the platen glass 44 on the upstream side (the left side in FIG. 6A) in the sub-scanning direction reading direction Y1 are adjacent to each other, and edges of the original G and the platen glass 44 on one side the upper side in FIG. GA) in the main scanning direction X are adjacent to each other), in some cases the original size detecting portion 270 detects the size of the original G as a size not assumed by a user, and detects the size of the original G as a size different from the size of the original G placed on the platen glass 44. In this case, the user often notices whether or not the original size detecting portion 270 has detect the size of the original G as a size different from the size of the original G placed on the platen glass 44 only after looking at the size of the recording paper P on which image has been formed. Then, if the user wants to form the image on the recording paper P of the proper size, it is necessary to form the image once again, resulting in waste.

In this regard, the control portion 100 functions as a display control portion for changing the color of the basic screen α, which is the operation screen displayed on the display portion 116 based on the size of the original G detected by the original size detecting portion 270. Note that in the present embodiment, the control portion 100 provided in the image forming apparatus 20 functions as the display control portion, but a control portion (not shown) for controlling overall original reading operation provided in the original reading apparatus 22 may alternatively function as the display control portion.

Here, when the color of the basic screen α is changed, the color of the entire display screen of the display portion 116 may be changed, or the color of a part of the display screen of the display portion 116 may be changed. If the color of a part of the display screen of the display portion 116 is changed, it is preferable to change the color of a 50% or larger area of the display screen of the display portion 116. Also, the colors of the basic screen α using similar colors having the same hue may be considered as the same color even if they have different color tones (brightness and/or saturation).

Specifically, the control portion 100 can perform display control according to the following first embodiment or second embodiment.

First Embodiment

The control portion 100 in the image forming apparatus 20 according to the first embodiment is configured to perform first display control for changing the color of the basic screen α to a unique color to each of sizes of the original G detected by the original size detecting portion 270.

Figure 7:
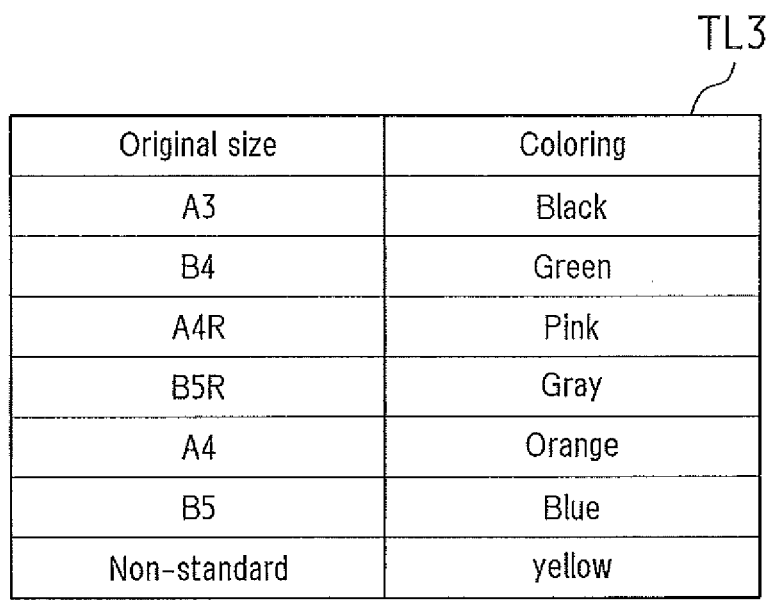
FIG. 7 is a schematic diagram for illustrating first display control for changing a color of a basic screen to a unique color to each of the sizes of the original detected by an original size detecting portion, and is a schematic diagram showing a data structure of a color-by-original-size setting table.

FIG. 7 is a diagram for illustrating the first display control for changing the color of the basic screen α to a unique color to each of the sizes of the original G detected by the original size detecting portion 270, and shows a data structure of a color-by-original-size setting table TL3.

As shown in FIG. 7, in the color-by-original-size setting table TL3, data for A3 size, B4 size, A4R size, B5R size, A4 size, and B5 size of the original G detected by the original size detecting portion 270 and data for a black color, a green color, a pink color, a gray color, an orange (reddish-yellow) color, and a blue color of the display portion 116 are set in a one-by-one correspondence. Note that the color-by-original-size setting table TL3 is stored in advance in the ROM 102 (here, an electrically rewritable nonvolatile memory) in the storage portion 101 (see FIG. 4). The non-standard size in the color-by-original-size setting table TL3 will be described later.

In the first embodiment, if the color for one of two consecutive sizes of the original G in the order of the sizes of the original G with its longitudinal direction aligned in one direction is an achromatic color, the control portion 100 that performs the first display control is configured to set the color for the other one to a chromatic color. Also, if both colors for the two consecutive sizes of the original G in the order of the sizes of the original G are chromatic colors, the control portion 100 is configured to use opposite colors.

Specifically, if the original G is arranged with its longitudinal direction aligned in the sub-scanning direction Y, the order of the sizes of the original G with its longitudinal direction aligned in one direction is, in a descending order, A3 size, B4 size, A4R size, and B5R size. If the original G is arranged with its longitudinal direction aligned in the main scanning direction X, the order of the size is, in a descending order, A4 size and B5 size.

Here, the "opposite colors" refer to a pair of colors, one of which is located at a position preferably having an angle over 90° and less than 270°, and more preferably an angle over 120° and less than 240° given that a color (complementary color) located at a right opposite position to the other (object color) of the pair of the color in a hue circle has an angle 180°. In the first embodiment and the second embodiment described later, the opposite colors are the pair of colors, one of which is located at a position having an angle over 90° and less than 270° given the above.

Figure 8:
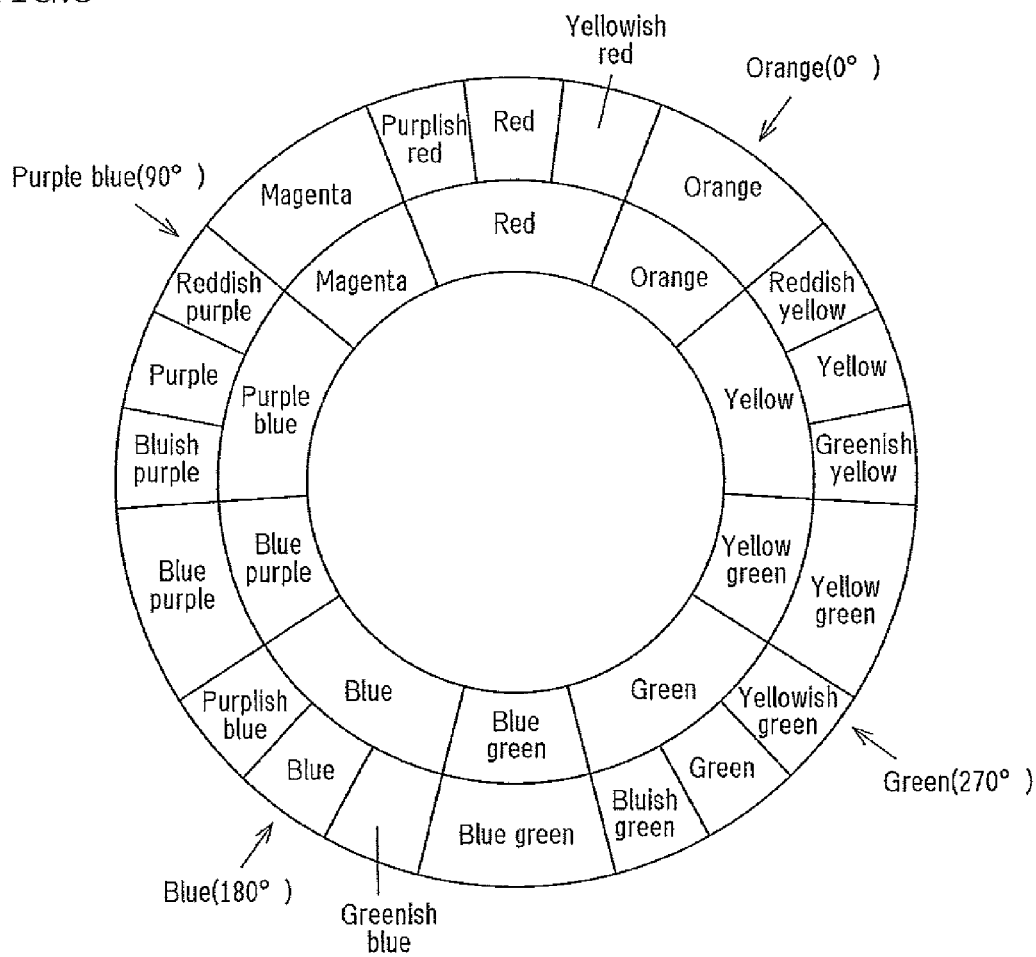
FIG. 8 is a diagram for illustrating the meaning of opposite colors, and is a circle diagram showing a hue circle in which hues are arranged in a circle shape.

FIG. 8 is a diagram for illustrating the meaning of the opposite colors, and is a circle diagram showing a hue circle in which hues are arranged in a circle shape.

In regard to the opposite colors, an exemplary case where both colors for A4 size and B5 size that are adjacent to each other in the order of the sizes of the original G with its longitudinal direction aligned in one direction are chromatic colors is described. Because the color for A4 size is orange, the color corresponding to B5 size is a color (specifically, blue) ranging from reddish purple blue to yellowish green at a position having an angle over 90° and less than 270°, given that blue (complementary color) located at a position opposite to orange has an angle of 180°. Note that the relative positions (an absolute angle of each color, e.g., an absolute angle with red at an angle of absolute 0°) of colors associated with a hue circle is stored in advance in the ROM 102 in the storage portion 101 (see FIG. 4).

Further, in the first embodiment, the color of the basic screen α includes a color (specifically, yellow) corresponding to the non-standard size other than the regular sizes (specifically, A3 size, B4 size, A4R size, B5R size, A4 size, and B5 size), In other words, in the color-by-original-size setting table TL3 shown in FIG. 7, data of the non-standard size and data of the color (specifically, yellow) of the basic screen α are set in association with each other.

If the size of the original G detected by the original size detecting portion 270 is the non-standard size, the control portion 100 that performs the first display control is configured to set the color of the basic screen α to the color (specifically, yellow) corresponding to the non-standard size.

Further, in the first embodiment, the color of the basic screen α includes, as the initial color displayed on the basic screen α (see FIG. 3) in its initial state (an example of an initial screen), a color (specifically, white) other than the colors (specifically, black, green, pink, gray, orange, and blue) set for the sizes of the original G detected by original size detecting portion 270.

Figure 9:
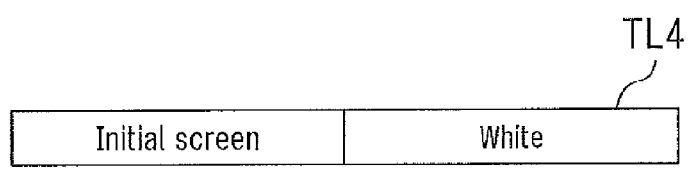
FIG. 9 shows a data structure of an initial screen color setting table in which color data of the basic screen in its an initial state has been set.

FIG. 9 shows a data structure of an initial screen color setting table TL4 in which data of the color of the basic screen α in its initial state is set.

As shown in FIG. 9, in the initial screen color setting table TL4, data of the color (specifically, white) of the basic screen α in its initial state is set. Note that the initial screen color setting table TL4 is stored in advance in the ROM 102 (here, an electrically rewritable nonvolatile memory) in the storage portion 101 (see FIG. 4).

Upon the original size detecting portion 270 detecting the size of the original G, the control portion 100 is configured to change the initial color (specifically, white) of the basic screen α in its initial state to the color corresponding to the size of the original G detected by the original size detecting portion 270.

Further, in the first embodiment, upon the original size detecting portion 270 that constitutes a reflective optical sensor detecting a change in the size of the original G, the control portion 100 is configured to immediately change the color of the basic screen α.

Regarding the Example of Control in the First Display Control

Next, an example of the first display control by the control portion 100 in the image forming apparatus 20 will be described with reference to FIGS. 10 to 12H.

Figure 10:
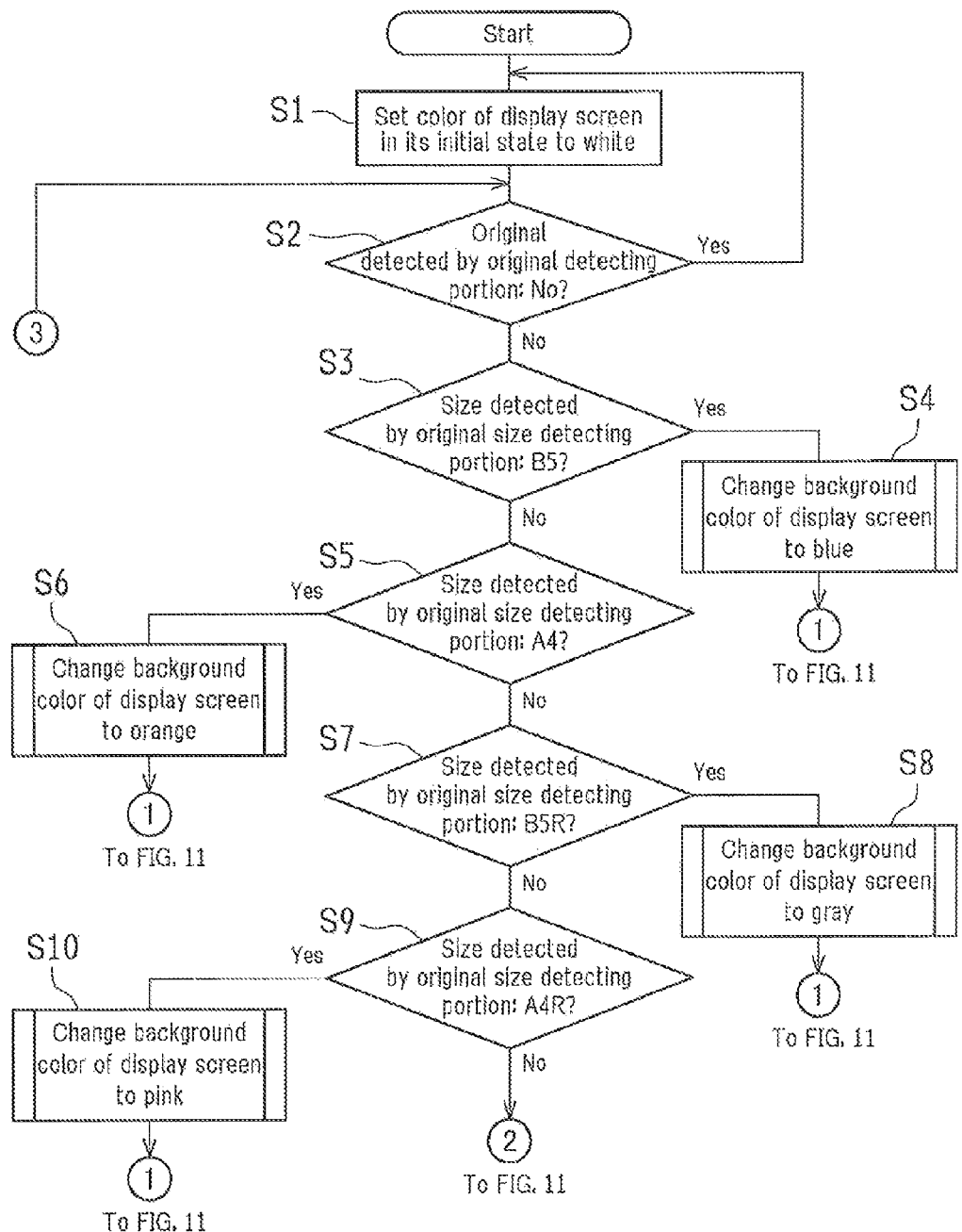
FIG. 10 is a flowchart showing the first half of an example of first display control by a control portion in the image forming apparatus.
Figure 11:
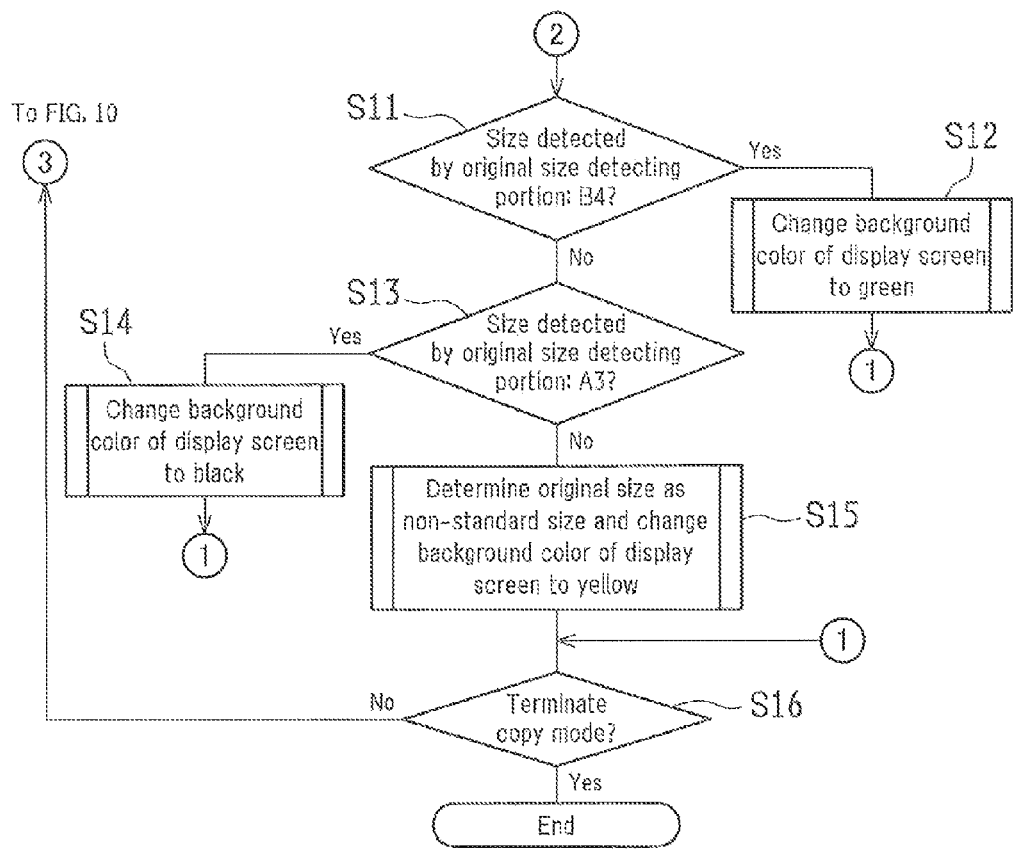
FIG. 11 is a flowchart showing the latter half of the example of the first display control by the control portion in the image forming apparatus.

FIG. 10 is a flowchart showing a first half of an example of the first display control by the control portion 100 in the image forming apparatus 20. FIG. 11 is a flowchart showing a latter half of the example of the first display control by the control portion 100 in the image forming apparatus 20. FIGS. 12A to 12H are schematic plan views showing background colors of the basic screen α displayed on the display portion 116 as a result of the first display control. FIGS. 12A to 12H show background colors for the initial screen, B5 size, A4 size, B5R size, A4R size, B4 size, A3 size, and the non-standard size, respectively.

In the control example shown in FIGS. 10 and 11, firstly, as shown in FIG. 10, data of white is read out as the color of the basic screen α in its initial state from the initial screen color setting table TL4 (see FIG. 9) in the storage portion 101, and the color of the basic screen α in its initial state (specifically, the initial screen) is set to white (see FIG. 12A) (step S1).

Next, whether or not the original G exists is determined from the result of detection of whether or not the original G exists by the original detecting portion 280 (step S2). If it is determined that the original G does not exist (step S2: Yes), the processing returns to step S1. Meanwhile, if it is determined that the original G exists, (step S2: No), the processing proceeds to step S3.

Next, whether or not the size of the original G is B5 is determined from the result of the original G size detection by the original size detecting portion 270 (step S3). If the size of the original G is B5 (step S3: Yes), data of blue is read out as the background color of the basic screen α of the display portion 116 from the color-by-original-size setting table TL3 (see FIG. 7) in the storage portion 101, the background color of the basic screen α of the display portion 116 is changed to blue (see FIG. 12B) (step S4), and the processing proceeds to step S16 in FIG. 11. Meanwhile, if the size of the original G is not B5 (step S3: No), the processing proceeds to step S5.

Next, whether or not the size of the original G is A4 is determined from the result of the original G size detection by the original size detecting portion 270 (step S5). If the size of the original G is A4 (step S5: Yes), data of orange is read out as the background color of the basic screen α of the display portion 116 from the color-by-original-size setting table TL3 (see FIG. 7) in the storage portion 101, the background color of the basic screen α of the display portion 116 is changed to orange (see FIG. 12C) (step S6), and the processing proceeds to step S16 in FIG. 11. Meanwhile, if the size of the original G is not A4 (step S5: No), the processing proceeds to step S7.

Next, whether or not the size of the original G is B5R is determined from the result of the original G size detection by the original size detecting portion 270 (step S7). If the size of the original G is B5R (step S7: Yes), data of gray is read out as the background color of the basic screen α of the display portion 116 from the color-by-original-size setting table TL3 (see FIG. 7) in the storage portion 101, the background color of the basic screen α of the display portion 116 is changed to gray (see FIG. 12D) (step S8), and the processing proceeds to step S16 in FIG. 11. Meanwhile, if the size of the original G is not B5R (step S7: No), the processing proceeds to step S9.

Next, whether or not the size of the original G is A4R is determined from the result of the original G size detection by the original size detecting portion 270 (step S9). If the size of the original G is A4R (step S9: Yes), data of pink is read out as the background color of the basic screen α of the display portion 116 from the color-by-original-size setting table TL3 (see FIG. 7) in the storage portion 101, the background color of the basic screen α of the display portion 116 is changed to pink (see FIG. 12E) (step S10), and the processing proceeds to step S16 in FIG. 11. Meanwhile, if the size of the original G is not A4R (step S9: No), the processing proceeds to step S11 in FIG. 11.

As shown in FIG. 11, whether or not the size of the original G is B4 is determined from the result of the original G size detection by the original size detecting portion 270 (step S11). If the size of the original G is B4 (step S11: Yes), data of green is read out as the background color of the basic screen α of the display portion 116 from the color-by-original-size setting table TL3 (see FIG. 7) in the storage portion 101, the background color of the basic screen α of the display portion 116 is changed to green (see FIG. 12F) (step S12), and the processing proceeds to step S16. Meanwhile, if the size of the original G is not B4 (step S11: No), the processing proceeds to step S13.

Next, whether or not the size of the original G is A3 is determined from the result of the original G size detection by the original size detecting portion 270 (step S13). If the size of the original G is A3 (step S13: Yes), data of black is read out as the background color of the basic screen α of the display portion 116 from the color-by-original-size setting table TL3 (see FIG. 7) in the storage portion 101, the background color of the basic screen α of the display portion 116 is changed to black (see FIG. 12G) (step S14), and the processing proceeds to step S16. Meanwhile, if the size of the original G is not A3 (step S13: No), the size of the original G is determined as the non-standard size, and the background color of the basic screen α of the display portion 116 is changed to yellow (see FIG. 12H) (step S15).

The processing in steps S2 to S15 is repeated until the copy mode is terminated (step S16: No) and the processing ends upon an instruction to terminate the copy mode being given (step S16: Yes).

Second Embodiment

The control portion 100 in the image forming apparatus 20 according to the second embodiment is configured to perform, instead of/in addition to (here, in addition to) the first display control, second display control for changing the color of the basic screen α according to size series (specifically, A series or B series) defined by ISO 216 corresponding to the size of the original G detected by the original size detecting portion 270. Here, the control portion 100 is capable of selectively switching between the first display control and the second display control on a selection screen (not shown).

Figure 13:
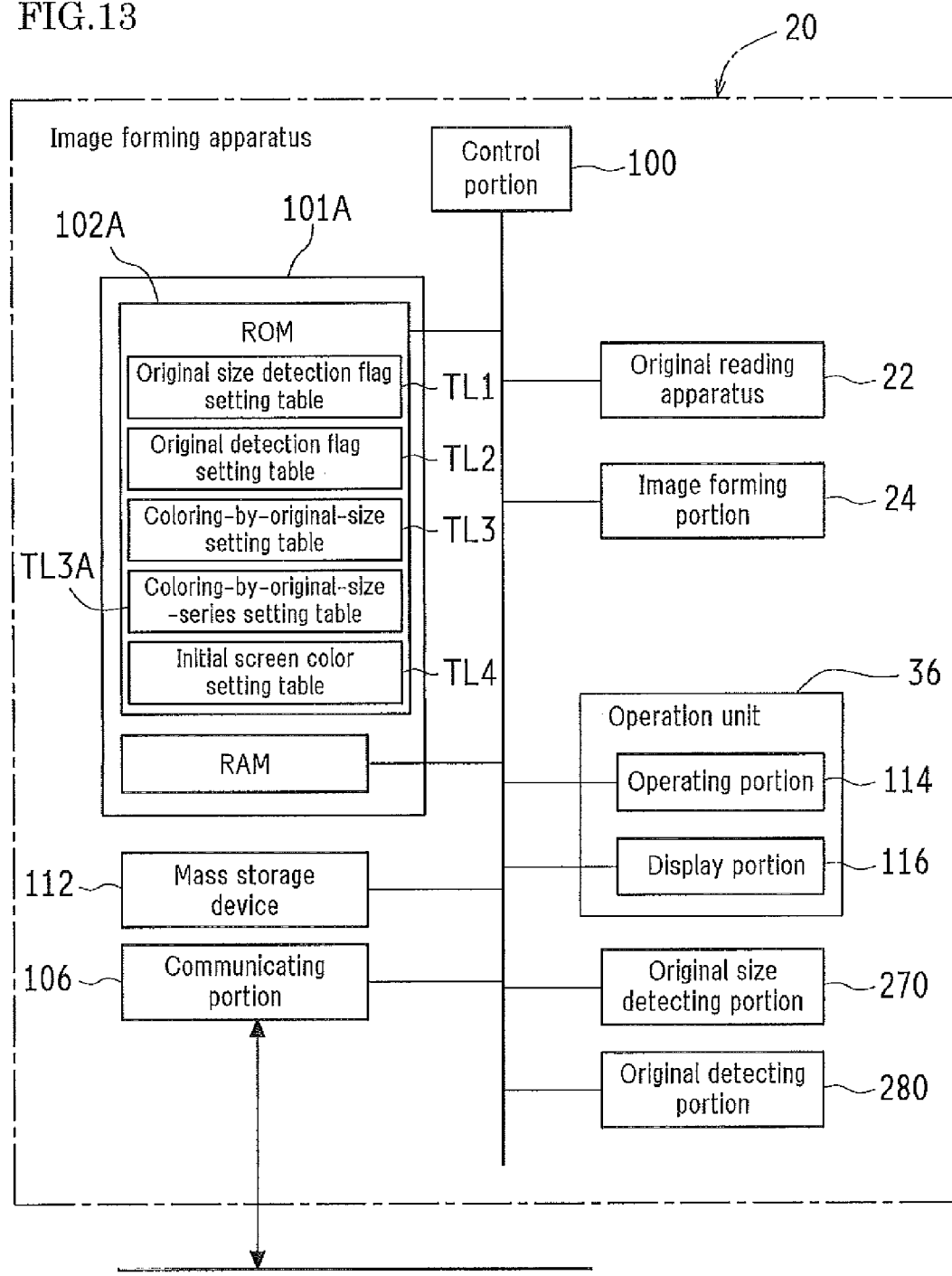
FIG. 13 is a schematic block diagram showing another example of hardware configuration of the image forming apparatus.

FIG. 13 is a schematic block diagram showing another example of hardware configuration of the image forming apparatus 20.

The hardware configuration shown in FIG. 13 is the same as the hardware configuration shown in FIG. 4, except that a storage portion 101A is provided in place of the storage portion 101 in the hardware configuration shown in FIG. 4. Accordingly, the members in FIG. 13 having the same configuration as the members shown in FIG. 4 are assigned with the same reference numerals, and the description thereof will be omitted.

The storage portion 101A stores a color-by-original-size-series setting table TL3A in addition to the original size detection flag setting table TL1, the original detection flag setting table TL2, the color-by-original-size setting table TL3, and the initial screen color setting table TL4 stored in the storage portion 101 in the first embodiment.

FIG. 14 is a diagram for illustrating the second display control for changing the color of the basic screen α according to the size series (specifically, A series or B series) defined by ISO 216 corresponding to the size of the original G detected by the original size detecting portion 270, and shows a data structure of a color-by-original-size-series setting table TL3A.

As shown in FIG. 14, in the color-by-original-size-series setting table TL3A, data of the plurality of size series (specifically, A series if A3 size, A4R size, and A4 size are detected, and B series if B4 size, B5R size, and B5 size are detected) of the original G detected by the original size detecting portion 270, and orange color and blue color of the basic screen α are set in a one-by-one correspondence. Note that the color-by-original-size-series setting table TL3A is stored in advance in a ROM 102A (here, an electrically rewritable nonvolatile memory) in the storage portion 101A (see FIG. 13).

In this second embodiment, if both colors for two consecutive series (specifically, A series and B series) defined by ISO 216 corresponding to the original G are chromatic colors, the control portion 100 that performs the second display control is configured to adopt the colors using colors opposite to each other. Note that if the color for one of the two consecutive series (specifically, A series and B series) defined by ISO 216 of the original G is an achromatic color, the control portion 100 that performs the second display control may be configured to use a chromatic color for the other series.

Further, in the second embodiment, the color of the basic screen α includes a color (specifically, yellow) corresponding to the non-standard size other than the regular sizes (specifically, A3 size, B4 size, A4R size, B5R size, A4 size, and B5 size), as in the first display control.

In other words, in the color-by-original-size-series setting table TL3A shown in FIG. 14, data of the non-standard size and the data of the color (specifically, yellow) of the basic screen α are set in association with each other.

Further, as in the first display control, the control portion 100 that performs the second display control is configured to set the color of the basic screen α to the color (specifically, yellow) corresponding to the non-standard size if the size of the original G detected by the original size detecting portion 270 is the non-standard size.

Regarding the Example of the Second Display Control

Next, an example of the second display control by the control portion 100 in the image forming apparatus 20 will be described with reference to FIGS. 15 and 16A to 16D.

Figure 15:
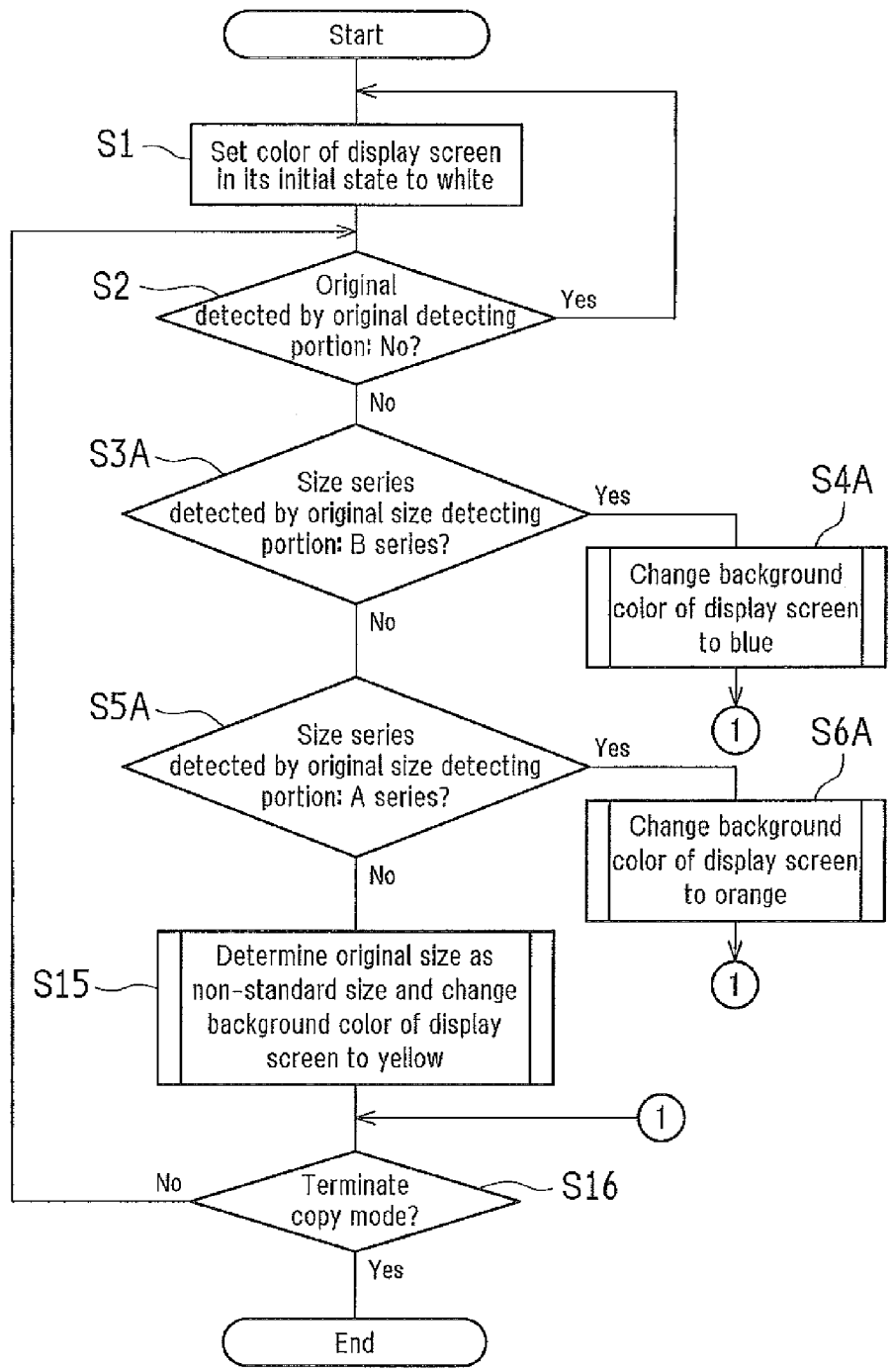
FIG. 15 is a flowchart showing an example of the second display control by the control portion in the image forming apparatus.
Figure 16A:
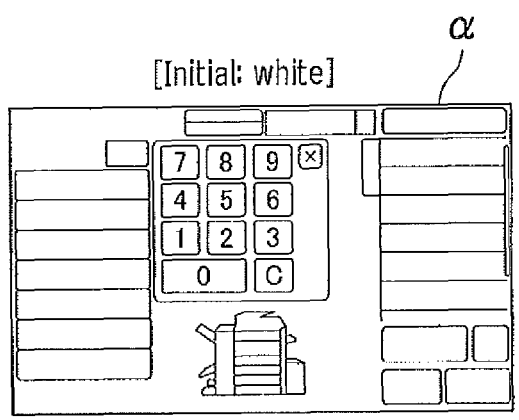
FIGS. 16A to 16D are schematic plan views showing background colors of the basic screen displayed on the display portion as a result of the second display control, where
Figure 16B:
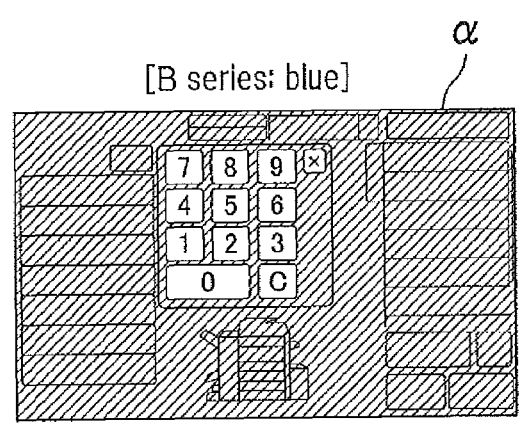
Figure 16C:
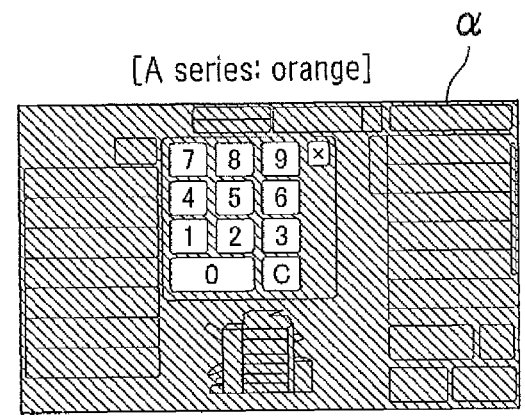
Figure 16D:
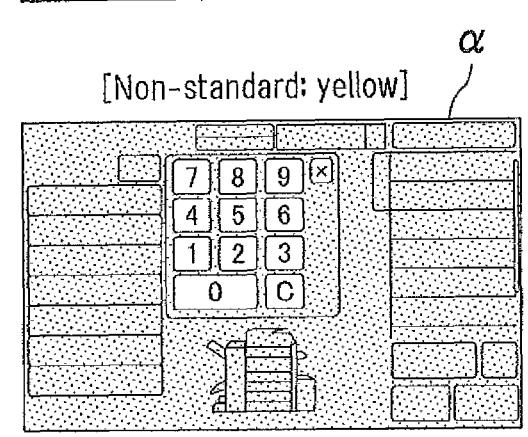

FIG. 15 is a flowchart showing the example of the second display control by the control portion 100 in the image forming apparatus 20. Note that in the same processing steps in FIG. 15 as the processing steps in FIGS. 10 and 11 are assigned with the same reference numerals. Also, FIGS. 16A to 16D are schematic plan views showing background colors of the basic screen α displayed on the display portion 116 as a result of the second display control. FIGS. 16A to 16D show the background colors for the initial screen, B series, A series, and the non-standard size, respectively.

In the example of the control shown in FIG. 15, firstly, data of white is read out as the color of the basic screen α in its initial state from the initial screen color setting table TL4 (see FIG. 9) in the storage portion 101A, and the color (specifically, initial screen) of the basic screen α in its initial state is set to white (see FIG. 16A) (step S1).

Next, whether or not the original G exists is determined from the result of detection of whether or not the original G exists by the original detecting portion 280 (step S2). If it is determined that the original G does not exist (step S2: Yes), the processing proceeds to step S1. Meanwhile, if it is determined that the original G exists (step S2: No), the processing proceeds to step S3.

Next, whether or not the size series of the original G is B series is determined from the result of the original G size detection by the original size detecting portion 270 (step S3A). If the size series of the original G is B series (step S3A: Yes), data of blue is read out as the background color of the basic screen α of the display portion 116 from the color-by-original-size-series setting table TL3A (see FIG. 14) in the storage portion 101A, the background color of the basic screen α of the display portion 116 is changed to blue (see FIG. 16B) (step S4A), and the processing proceeds to step S16. Meanwhile, if the size series of the original G is not B series (step S3A: No), the processing proceeds to step S5A.

Next, whether or not the size series of the original G is A series is determined from the result of the original G size detection by the result of the original G size detection by the original size detecting portion 270 (step S5A). If the size series of the original G is A series (step S5A: Yes), data of orange is read out as the background color of the basic screen α of the display portion 116 from the color-by-original-size-series setting table TL3A (see FIG. 14) in the storage portion 101A, the background color of the basic screen α of the display portion 116 is changed to orange (see FIG. 16O) (step S6A), and the processing proceeds to step S16. Meanwhile, if the size series of the original G is not A series (step S5A: No), the size of the original G is determined as the non-standard size, and the background of the basic screen α of the display portion 116 is changed to yellow (see FIG. 16D) (step S15).

The processing in steps S2 or S15 is repeated until the copy mode is terminated (step S16: No) and the processing ends upon an instruction to terminate the copy mode being given (step S16: Yes).

As described above, according to the first and second embodiments, the control portion 100 changes the color of the basic screen α based on the size of the original G detected by the original size detecting portion 270. Therefore, it is possible to alert a user to whether or not the original size detecting portion 270 has detected a size different from the size of the original G placed on the platen glass 44, and to thereby reliably notifying the user thereof. For example, the user can notice whether or not the original size detecting portion 270 has detected a size different from the size of the original G placed on the platen glass 44 before the image is formed, and it is possible to avoid waste of copy operation such as performing image formation again.

Further, in the first display control in the first embodiment, the control portion 100 changes the color of the basic screen α to a unique color to each of the sizes of the original G detected by the original size detecting portion 270, and it is thus possible to alert, by size, the user and reliably notify the user whether or not the original size detecting portion 270 has detected a size different from the size of the original G placed on the platen glass 44.

Further, in the first display control in the first embodiment, if the color of the basic screen α for one of two consecutive sizes of the original G in the order of the sizes of the original G with its longitudinal direction aligned in one direction is an achromatic color, the color for the other size is a chromatic color. It is thus possible to enable a user to easily recognize the difference between the achromatic color (e.g., gray) and the chromatic color (e.g., pink) as the color between the two consecutive sizes (e.g., between B5R size and A4R size) of the original G in the order of the sizes of the original G, and clearly alert the user and reliably notify the user whether or not the original size detecting portion 270 has detected a size different from the size of the original G placed on the platen glass 44.

Further, in the first display control in the first embodiment, if both colors of the basic screen α for two consecutive sizes of the original G in the order of the sizes of the original G with its longitudinal direction aligned in one direction are chromatic colors, colors opposite to each other are used as those colors. It is thus possible to enable a user to easily recognize the difference between the chromatic colors (e.g., difference between blue and orange) as the colors for the two consecutive sizes (e.g., B5 size and A4 size) of the original G in the order of the sizes of the original G, and clearly alert the user and notify the user whether or not the original size detecting portion 270 has detected a size different from the size of the original G placed on the platen glass 44.

Furthermore, in the second display control in the second embodiment, the control portion 100 has a simple control configuration in which the color of the basic screen α is changed according to the size series (specifically, A series or B series), and it is thus possible to alert a user and reliably notify the user whether or not the original size detecting portion 270 has detected a size different from the size of the original G placed on the platen glass 44.

Further, in the second display control in the second embodiment, if both colors of the basic screen α for two consecutive series (specifically, A series and B series) of the original G defined by ISO 216 are chromatic colors, colors opposite to each other are used as those colors. Therefore, it is possible to enable a user to easily recognize the difference between the chromatic colors as the colors for the two consecutive series (specifically, A series and B series) of the original G, and thus clearly alert the user and reliably notify the user whether or not the original size detecting portion 270 has detected a size different from the size of the original G placed on the platen glass 44. Note that if the color of the basic screen α for one of the two consecutive series (specifically, A series and B series) of the original G defined by ISO 216 is an achromatic color, the color for the other series is a chromatic color. In this case, it is possible to enable a user to easily recognize the difference between the achromatic color and the chromatic color as the colors for the two consecutive series (specifically, A series and B series) of the original G, and thus clearly alert the user and reliably notify the user whether or not the original size detecting portion 270 has detected a size different from the size of the original G placed on the platen glass 44.

Further, in the first display control in the first embodiment and the second display control in the second embodiment, if the size of the original G detected by the original size detecting portion 270 is the non-standard size, the control portion 100 sets the color of the basic screen α to the color (specifically, yellow) corresponding to the non-standard size. Therefore, even if the size of the original G detected by the original size detecting portion 270 is the non-standard size, it is possible to alert a user and reliably notify the user whether or not the original size detecting portion 270 has detected a size different from the size of the original G placed on the platen glass 44.

Further, in the first display control in the first embodiment and the second display control in the second embodiment, upon the original size detecting portion 270 detecting the size of the original G, the control portion 100 changes the initial color (specifically, white) of the basic screen α in its initial state (specifically, the initial screen) to the color corresponding to the size of the original G detected by the original size detecting portion 270, and it is thus possible to enable a user to easily recognize that the size of the original G has been detected by the original size detecting portion 270 from the initial screen state.

Further, in the first display control in the first embodiment and the second display control in the second embodiment, the control portion 100 immediately changes the color of the basic screen α upon the original size detecting portion 270 that constitutes a reflective optical sensor detecting a change in the size of the original. G, and it is thus possible to immediately alert the user to whether or not the original size detecting portion 270 has detected a size different from the size of the original G placed on the platen glass 44, and thereby quickly and reliably notifying the user thereof.

Further, in the first display control in the first embodiment and the second display control in the second embodiment, the control portion 100 is configured to be able to change the setting for the colors of the basic screen α corresponding to the sizes of the original G.

Next, the case where the control portion 100 is configured to change the setting for the colors of the basic screen α corresponding to the sizes of the original G will be described with reference to FIGS. 17A, 17B, and 18.

Figure 17A:
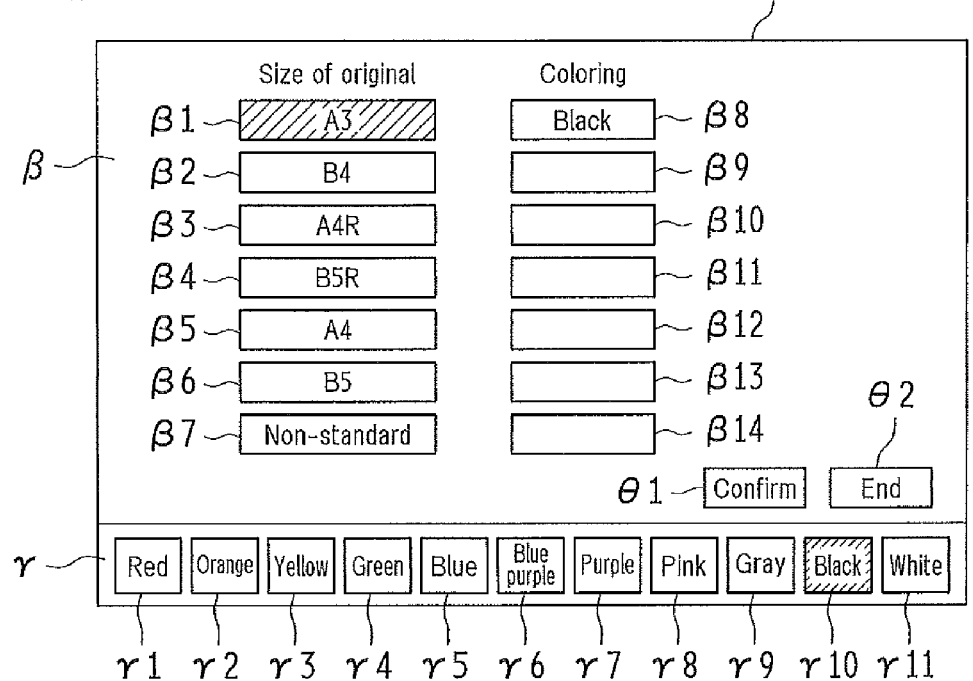
FIGS. 17A and 17B are schematic diagrams showing an example of a setting screen for changing the setting for colors of the basic screen corresponding to the sizes of the original, where
Figure 17B:
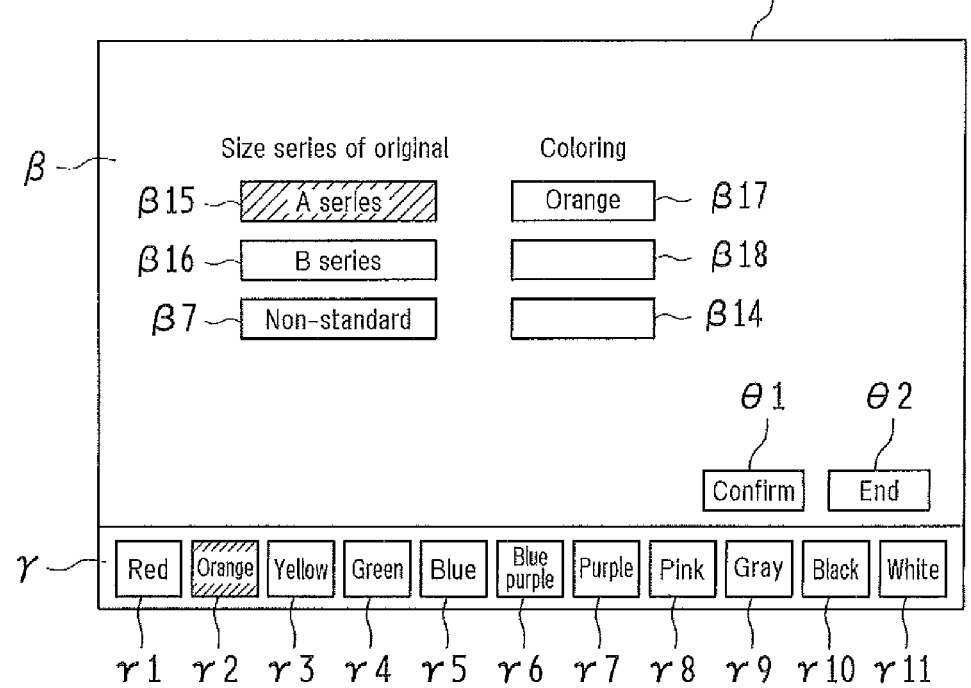

FIGS. 17A and 17B are schematic diagrams showing examples of a setting screen for changing the setting for the colors of the basic screen α corresponding to the sizes of the original G. FIG. 17A shows a setting screen for changing the settings for the colors of the basic screen α corresponding to the sizes of the original G in the first display control, and FIG. 17B shows a setting screen for changing the setting for the colors of the basic screen α corresponding to the size series of the original G in the second display control.

Each of the setting screens shown in FIGS. 17A and 17B is divided into a color setting area β and a color select area γ.

The color setting area β shown in FIG. 17A includes size display areas β1 to β7 and color display areas β8 to β14. The control portion 100 that performs the first display control causes the sizes of the original G (A3, B4, A4R, B5R, A4, B5, and the non-standard size in the example of the figure) to be displayed in the size display areas β1 to β7, and causes colors accepted upon the user selecting the colors in the color select area γ to be displayed in the color display areas β8 to β14 in association with the size display area β1 to β7.

Also, the color setting area β shown in FIG. 17B includes size display areas β15, β16, and β7 and color display areas β17, β18, and β14. The control portion 100 that performs the second display control causes a plurality of size series (specifically, A series and B series) and the non-standard size of the original G to be displayed in the size display areas β15, β16, and β7, and causes colors accepted upon the user selecting the color in the color select area γ to be displayed in the color display areas β17, β18, and β14 in association with the size display areas β15, 16, and β7.

The color select area γ shown in FIGS. 17A and 17B includes select display areas γ1 to γ11. The control portion 100 that performs the first and second display controls causes a plurality of mutually different colors (red, orange, yellow, green, blue, blue purple, purple, pink, gray black, and while in the example of the figure) to be displayed as the colors of the basic screen α in the select display areas γ1 to γ11 such that any one of them can be selected by user's operation (specifically, touch operation).

Also, the color setting area β shown in FIGS. 17A and 17B has a "confirm" button θ1 and an "end" button θ2. The control portion 100 that performs the first and second display controls confirms the color upon accepting user's operation (specifically, touch operation) on the "confirm" button θ1. Also, the control portion 100 that performs the first and second display controls, upon accepting user's operation (specifically, touch operation) on the end button θ2, accepts the selected colors if all colors have been confirmed, and cancels the color setting change and returns to the previous operation screen if at least one colors have not been confirmed.

Specifically, the control portion 100 that performs the first display control sequentially accepts selection of the colors of the basic screen α in the descending or ascending order (the descending order in the example of FIG. 17A) of the sizes of the original G with its longitudinal direction aligned in one direction.

Specifically, except the first-time setting (setting for A3 size in this example), in the control portion 100 that performs the first display control, the color for a size of the original G is unable to be selected if the color for its adjoining size (the next larger size in this example) has not been confirmed.

In other words, in the first-time setting, the control portion 100 that performs the first display control makes display of the size display area β1 for A3 size in the color setting area β different (here, reversed display) from display of the other size display areas β2 to β7, and enables the user to select the color for A3 size in the color select area γ. Then, upon a desired color (black of the select display area Y10 in the color select area γ in the example of FIG. 17A) being selected by user's operation, the control portion 100 that performs first display control makes display of the selected select display area γ10 different (here, reverse display) from display of the other select display areas γ1 to γ9 and γ11, and causes the color (black in the example of FIG. 17A) selected in the color select area γ to be displayed in the color display area β8 corresponding to A3 size in the color setting area β. At this time, upon the confirm button θ1 being operated, the control portion 100 that performs the first display control confirms the selected color and restores the different display (here, reverse display) of the size display area β1 to its original display.

Next, the control portion 100 that performs the first display control makes display of the size display area β2 for B4 size in the color setting area β different (here, reverse display) from display of the other size display areas β1 and β3 to β7, and enables the user to select the color for B4 size in the color select area γ. At this time, selection of the already selected color (black in this example) is disabled, and if the color for the adjoining size of the original G (the next larger size in this example) is an achromatic color (black in this example), selection of achromatic colors (gray and white in this example) is disabled. Further, if the color for the adjoining size of the original G (the next larger size in this example) is a chromatic color, selection of colors close to the color for the adjoining size (the next larger size in this example) of the original G (specifically, given that a color (complementary color) located at a right opposite position relative to an object color forms 180°, colors located at positions each having an angle over 0° and 90° or less, or an angle of 270° or larger and less than 360°) is disabled. Note that among the select display areas γ1 to γ11 in the color select area γ, the select display area, selection of which is disabled, is dimmed such that the user cannot select it. The control portion 100 that performs the first display control may disable selection of colors located at positions having an angle over 0° and 120° or less, or an angle of 240° or larger and less than 360°. This also applies to the case of the second display control described later.

Upon a desired color being selected by user's operation, the control portion 100 that performs the first display control makes display of the selected select display area different (here, reverse display) from display of the other select display areas, and causes the color selected in the color select area γ to be displayed in the color display area β9 corresponding to B4 size in the color setting area β. At this time, upon the confirm button θ1 being operated, the control portion 100 that performs the first display control confirms the selected color and restores the different display (here, reverse display) of the size display area β2 to its original display.

After that, the control portion 100 that performs the first display control similarly changes the color setting for the sizes subsequent to A4R, and also the non-standard size.

Further, as shown in FIG. 17B, the control portion 100 that performs the second display control sequentially accepts selection of the colors of the basic screen α for the plurality of size series (specifically, A series and B series) and the non-standard size of the original G.

Specifically, the control portion 100 that performs the second display control makes the display of the size display area β15 for A series in the color setting area β different (here, reverse display) from display of the other size display areas β16 and β7, and enables the user to select the color for the A series size in the color select area γ. Upon a desired color (orange of the select display area γ2 in the color select area γ in the example of FIG. 17B) being selected by user's operation, the control portion 100 that performs the second display control makes display of the selected select display area γ2 different (here, reverse display) from display of the other select display areas γ1 and γ3 to γ11, and causes the color (orange in the example of FIG. 17B) selected in the color select area γ to be displayed in the color display area β17 corresponding to A series in the color setting area β. At this time, upon the confirm button θ1 being operated, the control portion 100 that performs the second display control confirms the selected color and restores the different display (here, reverse display) of the size display area β15 to its original display.

Next, the control portion 100 that performs the second display control makes display of the size display area β16 corresponding to B series in the color setting area β different (here, reverse display) from display of the other size display areas β15 and β7, and enables the user to select the color for the B series sizes in the color select area γ. At this time, selection of the already selected color (orange in this example) is disabled, and if the color for the adjoining series (A series in this example) of the original G is an achromatic color, selection of achromatic colors is disabled. Further, if the color for the adjoining series (A series in this example) of the original G is a chromatic color (orange in this example), selection of colors close to the color for the adjoining series (A series in this example) of the original G (specifically, given that a color (complementary color) located at a right opposite position relative to an object color forms 180°, colors located at positions each having an angle over 0° and 90° or less, or an angle of 270° or larger and less than 360° (red, yellow, and pink in this example) is disabled.

Then, upon a desired color being selected by user's operation, the control portion 100 that performs the second display control makes display of the selected select display area different (here, reverse display) from display of the other select display areas, and causes the color selected in the color select area γ to be displayed in the color display area β18 corresponding to the B series sizes in the color setting area β. At this time, upon the confirm button θ1 being operated, the control portion 100 that performs the second display control confirms the selected color and restores the different display (here, reverse display) of the size display area β16 to its original display.

After that, the control portion 100 that performs the second display control similarly changes the color setting for the non-standard size.

Figure 18:
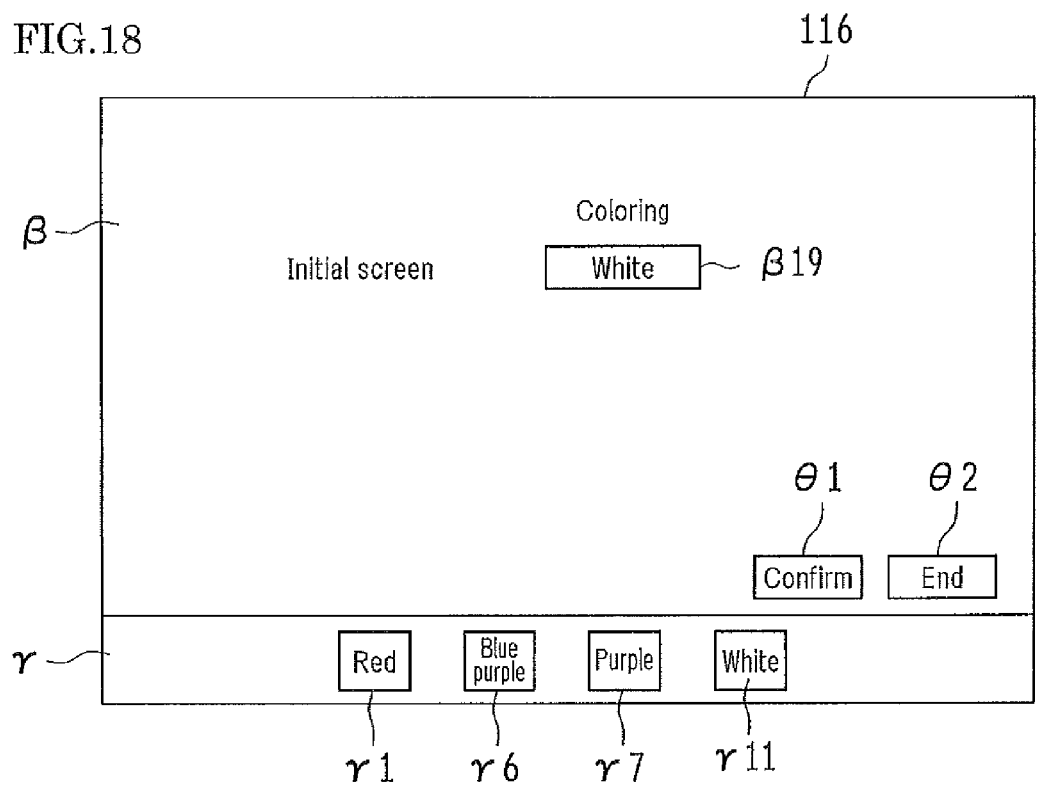
FIG. 18 is a diagram showing a setting screen for changing a setting of the color for the initial state of the basic screen.

FIG. 18 shows the setting screen for changing the setting for the color of basic screen α in its initial state.

The setting screen shown in FIG. 18 is divided into a color setting area β and a color select area γ. The color setting area 6 shown in FIG. 18 includes the color display area β19 corresponding to the initial state (specifically, the initial screen) of the basic screen α. The control portion 100 that performs the first and second display controls causes a color accepted upon the user selecting the color in the color select area γ to be displayed in the color display area β19.

The color select area γ shown in FIG. 18 includes, among the select display areas γ1 to γ11, the select display areas (γ1, γ6, γ7, and γ11 in the example of FIG. 18) for the colors other than the colors selected in the first or second display control (red, blue purple, purple, and white other than the colors selected in the first display control in the example of FIG. 18). The control portion 100 that performs the first and second display controls causes, as the color of the basic screen α, colors other than the colors selected in the first or second display control (red, blue purple, purple, and white other than the colors selected in the first display control in the example of FIG. 18) to be displayed in the select display areas (γ1, γ6, γ7, and γ11 in the example of in FIG. 18) such that the any one of them can be selected by user's operation (specifically, touch operation).

Also, the color setting area β shown in FIG. 18 has a "confirm" button θ1 and an "end" button θ2. The control portion 100 that performs the first and second display controls confirms the color upon accepting user's operation (specifically, touch operation) on the "confirm" button θ1. Also, upon accepting user's operation (specifically, touch operation) on the end button 82 the control portion 100 that performs the first and second display controls accepts the selected colors if the colors have been confirmed, and cancels the color setting change and returns to the previous operation screen if the colors have not been confirmed.

Specifically, upon a desired color (white of the select display area γ11 in the color select area γ in the example of FIG. 18) being selected by user operation, the control portion 100 that performs the first and second display controls makes display of the selected select display area γ11 different (here, reverse display) from display of the other select display areas γ1, γ6, and γ7, and causes the color (white in the example of FIG. 18) selected in the color select area γ to be displayed in the color display area β19 corresponding to the initial screen. At this time, if the confirm button θ1 is operated, the control portion 100 confirms the selected color.

As described above, in the processing for the setting screen shown in FIGS. 17A, 17B, and 18, the setting for the colors of the basic screen α corresponding to the sizes of the original G can be arbitrarily changed by user's selection operation, and it is thus possible to set the colors of the basic screen α to suit user's preference. Note that the same processing for the setting screen shown in FIGS. 17A, 17B, and 18 is performed when a new color is set and when an already set color is changed.

Other Embodiments

The first and second embodiments has been described above taking as an example the case where the original G placed on the platen glass 44 is detected by the original size detecting portion 270 that is a reflective optical sensor, but the same description applies even if the size of the original G is detected from image data obtained by scanning (pre-scanning) the original G placed on the platen glass 44 by using a first scanning unit 50 and a second scanning unit 52.

Further, the first and second embodiments have been described above taking as an example the case where the platen glass 44 is used the an original placement portion for reading an image of the original G in the stationary original arrangement, and the original size detecting portion 270 is used as the original size/type detecting portion. However, the same description applies even if the original set tray 31 is used as the original placement portion for reading an image of the original in the moving original arrangement, and the original size detecting portion 32 is used as the original size/type detecting portion, as shown in FIG. 1.

In other words, the original size detecting portion 32 includes a plurality of original size detection sensors 33 and 34 and is provided on the original set tray 31.

Specifically, the original set tray 31 is equipped with a moving mechanism (not shown) for moving a pair of regulating members in conjunction with each other in the main scanning direction X such that the position of the original in the main scanning direction X is positioned at the center in the main scanning direction X of the original set tray 31, and the original size detection sensor (e.g., a variable resistor) 33 can detect the size of the original in its depth direction (the main scanning direction X) by obtaining displacement information (e.g., a voltage corresponding to a resistance value of the variable resistor) on the moving mechanism in the original set tray 31 on which the original is placed. Meanwhile, the original size detection sensor (e.g., a reflective optical sensor) 34 can detect the size of the original in its width direction (the sub-scanning direction Y) by obtaining information (e.g., an on/off signal) about whether or not light reflected from the original placed on the original set tray 31 exists.

Further, the first and second embodiments have been described above taking as an example the case where the original size detecting portion 270 that can detect the size of the original that is one of a plurality of standard sizes (regular sizes) is used as the original size/type detecting portion. However, an original size detecting portion for detecting whether the size of the original is the standard size or the non-standard size (the size other than the regular sizes) may be used as the original size/type detecting portion, and the control portion 100 may change the color of the basic screen α based on the result of detection (whether the original size is the standard size or the non-standard size) by this original size detecting portion.

Further, as the original size/type detecting portion, one that detects the type of the original, for example, the type of an image feature (a photographic paper photograph original, a text original, a screened halftone image original, a mixture of those original types, etc.), a color original or a monochrome original, a material type (a photographic paper, a coated paper, a plain paper, etc.), and the like may be used instead of detecting the size of the original, or in addition to detecting the size of the original, and the control portion 100 may change the color of the basic screen α based on the detected type (and the size) of the original.

Examples of the method for detecting the type of the original used by the original size/type detecting portion include a method in which an original image is segmented into a background area, a photographic paper photograph area, a text area, and a screened halftone image area using segmentation processing, and it is determined, based on a proportion of the number of pixels in each area to the number of all pixels, which of a photographic paper photograph original, a text original, and a screened halftone image original the original is; a method in which whether each pixel in an original image is a color pixel or a monochrome pixel is determined, a predetermined number or more of consecutive color pixels are recognized as a color block, the number of color lines, each being a line including a predetermined number or more of color blocks, is measured, and it is determined that the original is a color image if a predetermined number or more of color lines exist in the original image; a method in which regular reflected light and diffused reflected light from an original are received respectively, and a material type of the original is detected based on a ratio between light amounts thereof (a regular reflection ratio), and the like. As a method for the above-mentioned segmentation processing, for example, a method in which an area with no edge (a steep intensity gradient) or no cyclic repetition of intensity change is segmented as a photographic paper photograph area, an area in the vicinity of an edge is segmented as a text area, and an area in the vicinity of a cyclic repetition of intensity change is segmented as a screened halftone image area may be used.

The present invention may be implemented in various other ways without departing from its spirit and main characteristics. Therefore, the above-described embodiments are mere examples in many aspects, and must not be interpreted in a restricting manner. The scope of the present invention is indicated by the scope of claims, and is not limited to the specification in any way. Furthermore, all variations and modifications equivalent to the scope of claims are embraced in the scope of the present invention.

What is claimed is:

1. An original reading apparatus provided with an original placement portion on which an original is placed, and an original size/type detecting portion for detecting a size of the original placed on the original placement portion, comprising: a display portion that performs color display; and a display control portion that changes a color of a display screen displayed on the display portion based on the size of the original detected by the original size/type detecting portion.

2. The original reading apparatus according to claim 1, wherein the original size/type detecting portion detects at least the size of the original placed on the original placement portion, and the display control portion changes the color of the display screen according to a size series defined by ISO 216 corresponding to the size of the original detected by the original size/type detecting portion.

3. The original reading apparatus according to claim 1, wherein the original size/type detecting portion detects at least the size of the original placed on the original placement portion, the color of the display screen includes a color corresponding to a size other than a regular size of the original, and if the size of the original detected by the original size/type detecting portion is the size other than the regular size, the display control portion sets the color of the display screen to the color corresponding to the size other than the regular size.

4. The original reading apparatus according to claim 1, wherein the color of the display screen includes, as an initial color displayed on an initial screen, a color other than a color set for the size and/or the type of the original to be detected by the original size/type detecting portion, and upon the original size/type detecting portion detecting the size of the original, the display control portion changes the initial color of the initial screen to a color corresponding to the size of the original detected by the original size/type detecting portion.

5. The original reading apparatus according to claim 1, wherein the display control portion is capable of changing a setting for the color of the display screen corresponding to the size of the original.

6. The original reading apparatus according to claim 1, wherein the display control portion that changes the color of the display screen displayed on the display portion based on the type of the original detected by the original size/type detecting portion.

7. The original reading apparatus according to claim 4, wherein upon the original size/type detecting portion detecting the type of the original, the display control portion changes the initial color of the initial screen to a color corresponding to the type of the original detected by the original size/type detecting portion.

8. The original reading apparatus according to claim 1, wherein the display control portion is capable of changing a setting for the color of the display screen corresponding to the type of the original.

* * * * *